Dec. 15, 1970  G. A. HUGHES ET AL  3,547,909
SYNTHESIS OF GONA-2,5(10)-DIENES
Original Filed Sept. 23, 1960  2 Sheets-Sheet 1

INVENTORS
GORDON ALAN HUGHES
HERCHEL SMITH
BY Vito Victor Bellino
ATTORNEY

Dec. 15, 1970         G. A. HUGHES ET AL         3,547,909
SYNTHESIS OF GONA-2,5(10)-DIENES
Original Filed Sept. 23, 1960                    2 Sheets-Sheet 2

INVENTORS
GORDON ALAN HUGHES
HERCHEL SMITH
BY Vito Victor Bellino
ATTORNEY

United States Patent Office 3,547,909
Patented Dec. 15, 1970

3,547,909
SYNTHESIS OF GONA-2,5(10)-DIENES
Gordon Alan Hughes, Haverford, Pa., and Herchel Smith,
500 Chestnut Lane, Wayne, Pa. 19087; said Hughes
assignor to said Smith
Continuation-in-part of application Ser. No. 228,384,
Oct. 4, 1962, which is a continuation of applications
Ser. No. 57,904, Sept. 23, 1960, Ser. No. 91,341,
Feb. 24, 1961, Ser. No. 137,535, Sept. 12, 1961, Ser.
No. 195,000, May 15, 1962, and Ser. No. 196,557,
May 16, 1962. This application Apr. 7, 1966, Ser. No.
540,924
Int. Cl. C07c *173/00*
U.S. Cl. 260—239.55
15 Claims

ABSTRACT OF THE DISCLOSURE

The synthesis of novel 13-polycarbonalkyl compounds having a gonane nucleus unsaturated in the 2- and 5(10)-positions and processes for preparing them are described. The novel compounds possess qualitatively varying hormonal effects in animals, or are intermediates for the preparation of compounds having qualitatively varying hormonal effects in animals. They are prepared from gona-1,3,5(10)-trienes, gona - 1,3,5(10),8 - tetraenes or gona-1,3,5(10),9(11)-tetraenes by alkali metal reduction in liquid ammonia.

This application is a continuation-in-part of co-pending application Ser. No. 228,384, filed Oct. 4, 1962; which in turn is a continuation of abandoned applications Ser. No. 57,904, filed Sept. 23, 1960; Ser. No. 91,341, filed Feb. 24, 1961; Ser. No. 137,535 filed Sept. 12, 1961; Ser. No. 195,000, filed May 15, 1962; and Ser. No. 196,557, filed May 16, 1962.

In describing the invention, reference will be made in the following specification to the annexed drawings, wherein.

The invention sought to be patented in a principal composition aspect, is described as residing in the concept of a gona-2,5(10)-diene nucleus having attached thereto in the 13-position a monovalent polycarbonalkyl radical.

The tangible embodiments of the composition aspect of the invention possess the inherent general physical properties of being white crystalline solids, are substantially insoluble in water and are generally soluble in polar solvents such as dimethylacetamide. Examination of compounds produced according to the hereinafter described process reveals, upon ultraviolet and infrared spectrographic analysis, spectral data supporting the molecular structures herein set forth. The aforementioned physical characteristics, taken together with the nature of the starting materials and the mode of synthesis, confirm the structure of the compositions sought to be patented.

The tangible embodiments of the invention possess the inherent use characteristics of exerting qualitatively varying hormonal effects in animals as evidenced by standard test procedures. Furthermore, said tangible embodiments possess the use characteristic of being intermediates for the preparation of compositions exerting hormonal effects as evidenced by standard test procedures.

The invention sought to be patented, in a principal process of making the compositions aspects, is described as residing in the concept of the sequence of reactions including: converting a compound having a 5-phenylpent-1-yne nucleus, ring unsubstituted in at least one position ortho to the point of chain attachment, by means of a Mannich type reaction, to its acetylenic amine derivative; hydrating the acetylenic linkage to form a 3-keto compound; reacting such 3-keto substrate compound with a nucleophilic 2-monovalent alkyl-1,3-dioxocyclopentano compound under Michael condensation conditions to attach the cyclopentane compound through its 2-position carbon atom to the 1-position carbon atom of the 3-keto compound; treating the bicyclic triketone formed in the preceding step with an acidic dehydrating agent thereby to effect a double cyclodehydration to form a 1,3,5(10),8,14-pentadehydro-13-alkyl gonane; selectively saturating the 14(15)-double bond of said gonane with hydrogen in the presence of a catalyst; thereafter saturating the 8(9)-double bond of the compound resulting from the preceding step; and thereafter reducing the 17-carbonyl group to 17-hydroxymethylene and partially reducing the A-ring double bonds to a 13-alkyl-17-hydroxy-2,5(10)-gonadiene.

Figure 2:
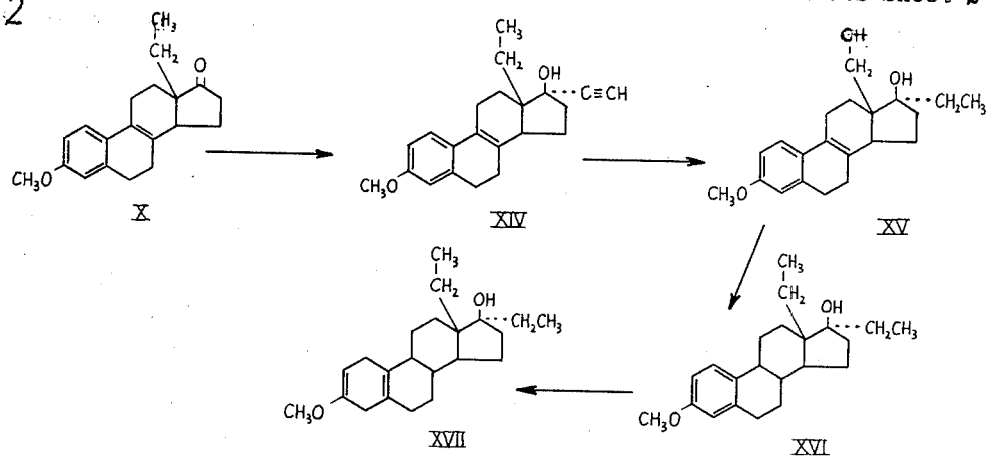
FIG. 2 illustrates schematically the reaction sequence for preparing a 13β,17α-dialkylgona-2,5(10)-dien-17β-ol from a 13β-alkylgona-1,3,5(10),8-tetraen-17-one, specifically 13β,17α - diethyl-3-methoxygona-2,5(10)-dien-17β-ol from 13β-ethyl-3-methoxygona-1,3,5(10),8-tetraen-17-one.

The invention sought to be patented in a second process aspect, as illustrated in annexed FIG. 2, is described as residing in the concept of a sequence of reactions including; treating a compound with a gona-1,3,5(10),8-tetraen-17-one nucleus having attached thereto in the 13-position a monovalent polycarbon-alkyl radical with an organometallic derivative of a 1-alkyne to obtain the corresponding 17α - alkynylgona-1,3,5(10),8-tetraen-17β-ol having attached thereto in the 13-position a monovalent polycarbon-alkyl radical; selectively saturating the alkynyl group with hydrogen in the presence of a catalyst, thereafter saturating the 8(9)-double bond of the compound resulting from the previous step; and thereafter partially reducing the A-ring double bonds to give a 17α-alkylgona-2,5(10)-dien-17β-ol having attached thereto in the 13-position a polycarbon-alkyl group.

Figure 3:
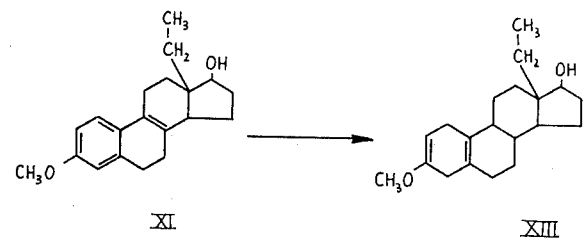
FIG. 3 illustrates schematically the reduction of a 13-alkylgona-1,3,5(10),8-tetraene directly to a 13-alkylgona-2,5(10)-diene specifically 13β-ethyl-3-methoxygona-1,3,5(10),8-tetraen-17β-ol to 13β-ethyl - 3 - methoxygona-2,5(10)-dien-17β-ol.

The invention sought to be patented in a third process aspect, as illustrated in annexed FIG. 3, is described as residing in the concept of a reaction comprising reducing a compound with a gona-1,3,5(10),8-tetraene nucleus having attached thereto in the 13 position a monovalent polycarbon-alkyl radical (XI) to obtain a compound with a gona-2,5(10)-nucleus having attached thereto in the 13-position a monovalent polycarbon-alkyl radical (XIII).

Figure 4:
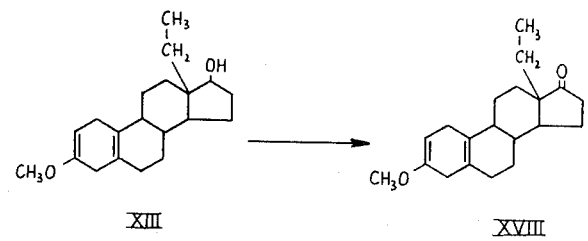
FIG. 4 illustrates schematically the oxidation of a 13-alkylgona-2,5(10)-dien-17-ol to a 13 - alkylgona-2,5(10)-dien-17-one, specifically 13β - ethyl-3-methoxygona-2,5(10)-dien-17β-ol to 13β-ethyl-3-methoxygona-2,5(10)-dien-17-one.

The invention sought to be patented in a fourth process aspect, as illustrated in annexed FIG. 4, is described as residing in the concept of an oxidation (Oppenauer) of a compound with a gona-2,5(10)-dien-17-ol nucleus, having attached thereto in the 13-position a monovalent polycarbon-alkyl radical (XIII) to obtain a compound with a gona-2,5(10)-dien-17-one nucleus having attached thereto in the 13-position a monovalent polycarbon-alkyl radical (XVIII).

Figure 5:
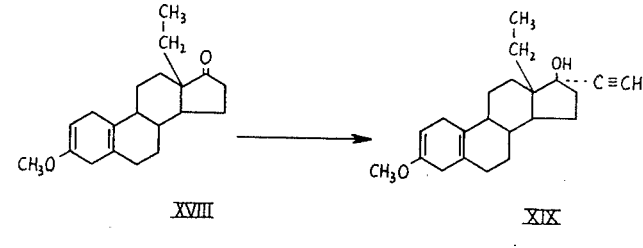
FIG. 5 illustrates schematically the alkynylation of a 13-alkylgona-2,5(10)-dien-17-one to a 13-alkyl-17-alkynylgona-2,5(10)-dien-17-ol, specifically 13β-ethyl - 3 - methoxygona-2,5(10)-dien-17-one to 13β-ethyl-17α-ethynyl-3-methoxygona-2,5(10)-dien-17β-ol.

The invention sought to be patented in a fifth process aspect, as illustrated in annexed FIG. 5 is described as residing in the concept of a reaction comprising treating a compound with a gona-2,5(10)-diene-17-one nucleus having attached thereto in the 13-position a monovalent polycarbon-alkyl radical (XVIII) with an organometallic derivative of a 1-alkyne to obtain the corresponding 17α-alkynylgona-2,5(10)-dien-17β-ol having attached thereto in the 13-position a monovalent polycarbon-alkyl radical (XIX).

The manner of making the chemical compounds, which are the starting materials for use in making the compounds of the invention, and for use in the processes of making the invention, are illustrated in co-pending applications Ser. No. 228,384 filed Oct. 4, 1962, and Ser. No. 534,353 filed Mar. 15, 1966.

Figure 1:
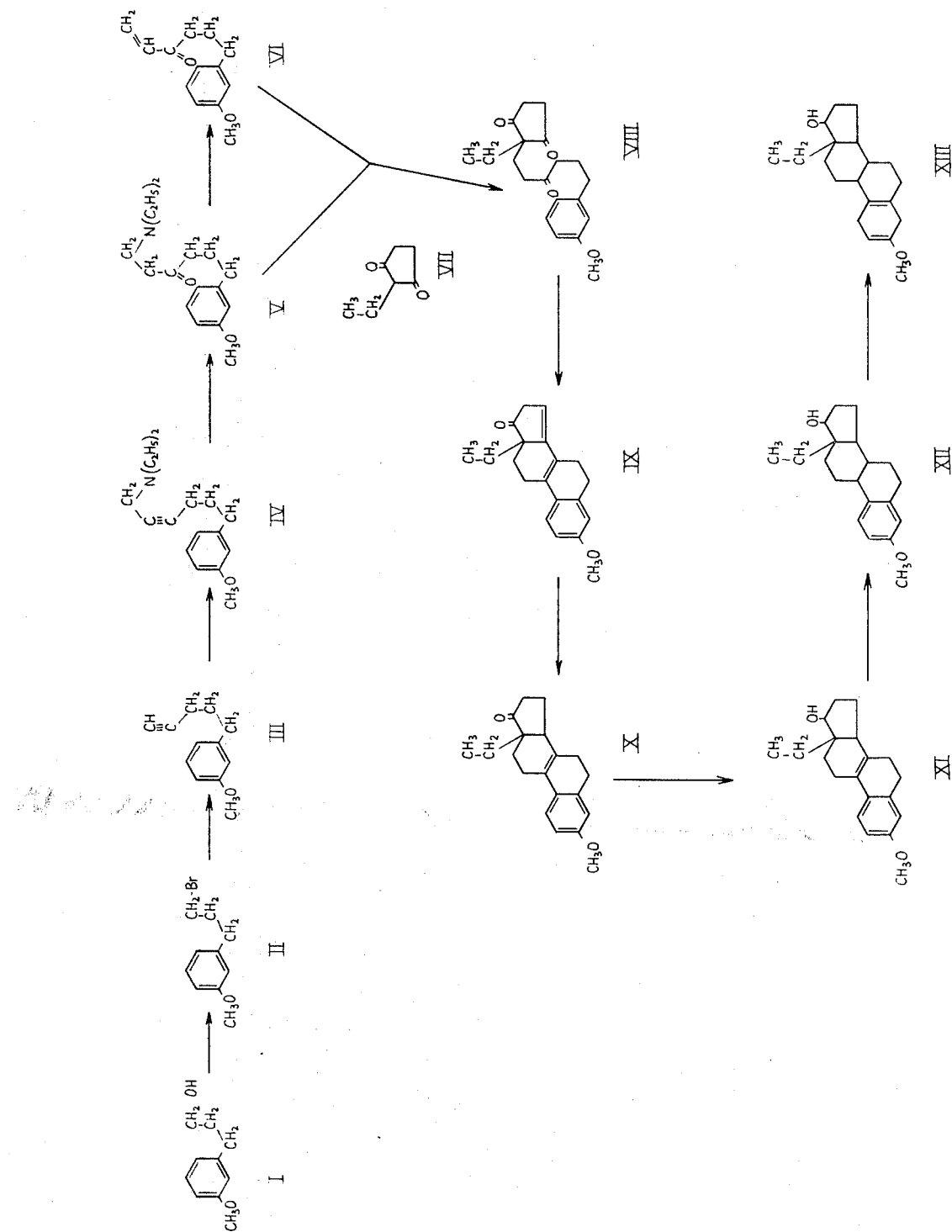
FIG. 1 illustrates schematically the reaction sequence for preparing a 13-alkylgona-2,5(10)-diene, specifically 13β-ethyl-3-methoxygona-2,5(10)-dien-17β-ol.

The manner and process of making and using the invention will now be generally described so as to enable a person skilled in the art of chemistry to make and use the same, as follows:

Referring now to FIG. 1, wherein the compounds are assigned Roman numerals for identification schematically, the sequence of reactions involved in the synthesis of a specific embodiment, namely 13β-ethyl-3-methoxygona-2,5(10)-dien-17β-ol, is illustrated. 3-(m(methoxyphenyl) propanol (I) is heated with phosphorus tribromide in benzene after dropwise addition in the cold to form 3-(m-methoxyphenyl)-propyl bromide (II). This halogen compound (II) dissolved in tetrahydrofuran is condensed with sodium acetylide in liquid ammonia to obtain 5-(m-methoxyphenyl)-1-pentyne (III). Compound III is allowed to stand under nitrogen with water, 30% Formalin, acetic acid, diethylamine, dioxan and cuprous chloride at 70 C. for about twelve hours whereby there is obtained 1 - diethylamino - 6 - (m - methoxyphenyl-2-hexyne (IV), which is in turn hydrated in the presence of a mercury salt and sulfuric acid to form 1-diethylamino-6-(m-methoxyphenyl)-3-hexanone (V). The ketamine (V) may eliminate diethylamine on distillation to give the vinyl ketone 6-(m-methoxyphenyl)-1-hexen-3-one (VI). Either the ketamine (V) or the ketone (VI) or mixtures thereof, is then reacted with 2-ethyl-1,3-cyclopentanedione (VII) under Michael condensation conditions, e.g., refluxing in methanolic potassium hydroxide to form 2-ethyl-2-[6-(m-methoxyphenyl) - 6 - oxohexyl] - 1,3 - cyclopentanedione (VIII). Compound VIII is then cyclodehydrated at the reflux temperature of a solvent, such as benzene, in the presence of a dehydrating acid, such as p-toluene sulfonic acid, to effect simultaneous ring closures to give the tetracyclic compound 13β-ethyl-3-methoxygona-1,3,5(10),8,14-pentaen-17-one (IX). The 14-unsaturation of compound IX is then selectively hydrogenated in the presence of a metal catalyst such as 2% palladized calcium carbonate, to form 13β-ethyl-3-methoxygona-1,3,5(10),8-tetraen-17-one (X). Reduction of compound X with sodium borohydride in ethanol gives 13β-ethyl-3-methoxygona-1,3,5(10),8-tetraen-17β-ol (XI), which is then converted to 13β-ethyl-3-methoxygona-1,3,5(10)-trien-17β-ol (XII) by alkali metal reduction in liquid ammonia, to provide the normal gonane configuration of 9,8-8, 14-14, 13-exocyclic substituents, namely trans-anti-trans.

By alkali metal reduction in liquid ammonia in the presence of a proton donor, such as ethanol (Birch reduction), compound XII is then converted to 13β-ethyl-3-methoxygona-2,5(10)-dien-17β-ol.

Referring now to FIG. 2, wherein the compounds are assigned Roman numerals for identification schematically, the sequence of reactions involved in the synthesis of a specific embodiment, namely 13β,17α-diethyl-3-methoxygona-2,5(10)-dien-17β-ol is illustrated. 13β-ethyl-3-methoxygona-1,3,5(10),8-tetraen-17-one (X) is reacted with lithium acetylide in dimethylacetamide to form 17α-ethynyl-13β-ethyl-3-methoxygona-1,3,5(10),8-tetraen-17β-ol (XIV) which is then selectively hydrogenated in the presence of a catalyst such as palladized calcium carbonate to form the corresponding 17α-ethyl compound XV. Compound XVIII is then reduced with an alkali metal in liquid ammonia to obtain 13β,17α-diethyl-3-methoxygona-1,3,5(10)-trien-17β-ol (XVI) which is then further reduced by alkali metal in liquid ammonia in the presence of a proton donor, such as ethanol (Birch reduction) to obtain 13β,17α - diethyl-3-methoxygona-2,5(10)-dien-17β-ol (XVII).

While the hereinbefore described processes produce novel and steroidal-like compounds which have an unnatural substituent at the 13-position, it is apparent that the novel and valuable processes of the invention offer a unique feasible route to the corresponding natural steroids if the nucleophilic compound used in the Michael condensation step is 2-methyl-1,3-cyclopentanedione.

The aromatic ring of the phenylpropanol (FIG. 1, I) used as starting material for the preparation of the compositions and initial preparations of the invention may have one or more substituents, provided, however, at least one position ortho to the position of propanol-chain attachment is unsubstituted so that cyclodehydration to form a cyclic structure can eventually be effectuated. To activate such ortho position for said subsequent ring closure, a para-directing group (referred to electrophilic aromatic substitution) such as hydroxy, acyloxy, alkoxy, amino, alkylamino, or acylamino is a necessary substituent on the aromatic ring. The group may be present initially or may be introduced later but before ring closure, either directly, or by conversion from a meta-directing group such as nitro. The term "para-directing group" (referring to electrophilic aromatic substitution) as used herein means an activating group such as those hereinbefore listed and which activates all positions on the aromatic nucleus. Thus, if the group is para-directing, as defined above it can be in a position meta to the ortho position to which ring closure is limited by steric considerations, said position being activated even though another position is more highly activated. Ring closure could not occur at the said more highly activated position because of the above-mentioned steric limitations. After the tetracyclic structure has been formed, substituents can be introduced into the aromatic A-ring which are not limited as above; however, if such substituted compound is to undergo a reduction, the group is preferably one not sensitive to reduction. After the A-ring has been reduced, the substituents on said A-ring may be the same as those originally present, or substituents to which they may be converted, such as ketonic oxygen, dialkoxy, alkylenedioxy; alkylenethioxy, and alkylenedithio; or groups introducible by known processes, such as halogen or alkyl. For the processes of the invention and except for the limitations expressed in this specification, variations of the substituents on the A-ring of the fully formed tetracyclic structures, or on the intermediates leading thereto, are full equivalents of each other.

The carbon atom to which the phenyl group of the starting propanol (I) is attached can be substituted, as, for example, with an alkyl group, such as methyl or ethyl. The 2-carbon atom of the starting phenyl propanol can also be substituted, as, for example, with an alkyl group, such as methyl and ethyl, and, as such, be unchanged throughout the subsequent synthesis. In the tetracyclic structures of the invention these carbon atoms will appear in the 6 and 7 positions respectively.

For the processes of the invention and except for the limitations expressed in this specification, variations of the B-ring on the fully formed tetracyclic structures, or on the intermediates leading thereto, are full equivalents of each other.

In the Michael reaction step, the 3-keto substrate compound can be a 6-phenyl-1-hexen-3-one, or alternatively, a 6-phenyl-3-hexanone having attached to the 1-position a group which will eliminate with hydrogen to form a 6-phenyl-1-hexen-3-one under Michael conditions. Thus, a 3-keto compound with a 1-dialkylamino substituent or its quaternary salt, a 1-halo substituent or a 1-hydroxy substituent will react with the nucleophilic compound to form the Michael product. The nucleophillic compound can be a carbocyclic-1,3-dione of varying ring size, as, for example, a five-membered ring, a six-membered ring etc., ultimately forming a corresponding five-membered, a six-membered, etc., D-ring in the tetracyclic structure. The 1,3-cyclodione may also contain a hetero atom at positions other than position 2, thereby to provide a heterocyclic D-ring in the tetracyclic structure. Acyclic nucleophilic compounds can be used in conducting the Michael reaction step and the open-chain of the resulting product thereafter ring-closed to form a cyclic D-ring.

For the processes of the invention, and except for the limitations expressed in this specification, variations of the D-ring on the fully formed tetracyclic structure, or on the intermediates leading thereto, are full equivalents of each other.

When the nucleophilic compound is 2-methyl-1,3-cyclopentanedione, the invention provides a unique total synthesis for natural steroids: the hydrogens at the 8-position, 9-position, and 14-position being $\beta,\alpha$, and $\alpha$, respectively, as in the natural steroids. Thus such valuable therapeutic substances as 19-nortestosterone are made available from easily obtainable and relatively simple and inexpensive starting materials.

Moreover, by varying the group at the 2-position of the nucleophilic Michael condensation reactant, the invention provides a way to produce compounds resembling the natural steroids save at the 13-position. Thus, by varying the substituent at the 2-position of the 1,3-cyclopentanedione, alkyl groups of varying chain lengths such as, for example, ethyl, isopropyl, cetyl, etc., may be introduced to form the gonane correspondingly substituted at the 13-position. Further, gonanes may be prepared wherein the 13-position is substituted with any organic radical. Thus, but without limiting the generality of the foregoing, an aralkyl, cycloalkylalkyl, or a polycarbonalkylene bridge bearing a hydroxy-, amino-, or alkylamino-substituent can readily be placed in the 13-position, and from such compounds other variations of the 13-position substituent can be prepared, as haloalkyls from hydroxyalkyls, or quaternary salts, amides, alkenyls, etc. from aminoalkyls.

For the processes of the invention and except for the limitations expressed in this specification, variations at the 13-position of the fully formed tetracyclic structures or on the intermediates leading thereto are the full equivalents of the claimed 13-position polycarbonalkyl substituents, having physiological activity of the same type.

In any of the intermediate structures or in the tetracyclic structures of the invention wherein the 17-position, or position corresponding thereto in the gonane nucleus, is carbonyl, the carbonyl group can be converted to a group such as hydroxymethylene by lithium aluminum hydride reduction, to acyloxymethylene by esterification of the hydroxymethylene group to alkoxymethylene by etherification of the hydroxymethylene group; to alkylhydroxymethylene by addition of the appropriate organometallic reagent to the carbonyl; or to alkynylhydroxymethylene by addition of the appropriate alkali metal acetylide in a suitable inert solvent; all in the known manner. The carbonyl group may also be ketallized or thioketalized by treating with the appropriate alcohol or glycol in a suitable inert solvent under acidic conditions, as in the presence of an acid such as sulfuric acid, p-toluene sulfonic acid, of boron trifluoride etherate, with heating where necessary, according to the known art.

The specific reactions involved in the processes of the invention will now be considered, as follows, reference being made to the drawings for typifying compounds:

The vinyl ketones (VI) of the invention are prepared by elimination of diakylamine from the corresponding dialkylaminoethyl aminoketones (V), obtained by hydration of the acetylenic linkage in an acetylenic amine (IV).

The acetylenic amines (IV) can be themselves prepared by a Mannich reaction from the corresponding acetylene (III)) with formaldehyde and a dialkylamine. The hydration can be carried out, for example, in aqueous sulfuric acid with mercuric sulfate as a catalyst. The corresponding quaternary salts, which may also be used in the subsequent Michael condensation, can be obtained by quaternization of the corresponding acetylenic dialkylaminoethyl amine, followed by hydration, or by quaternization of the ketoamine. The vinyl ketones can be prepared from these derivatives by the above elimination reaction. Thus the ketoamine or its quaternary salt can be treated with a base for this purpose, for example, with sodium alkoxide.

The vinyl ketones (VI) and dialkylamino ketones (V) are condensed with a nucleophilic compound under Michael reaction conditions. Thus the condensation can be carried out by bringing the two reagents together in solution in the presence of a base, for example, pyridine, triethylamine, diethylamine, sodium hydroxide, or sodium methoxide, and heating as required. The nature and amount of base employed in the condensation reaction will depend upon the particular reagents used. Where the vinyl ketone derivative employed is a keto-amine and dialkylamine is eliminated in the reaction, no added base may be required. Where the compound is a 2-alkylcyclopentane-1,3-dione (VII), the compound to be condensed with it is preferably a vinyl ketone, and the dione is used in excess of the molecular equivalent quantity. Suitable solvents are hydrocarbons, such as benzene, and anhydrous alcohols, such as methanol. If the reaction is carried out in benzene under refluxing conditions, water formed in the condensation may be azeotroped out of the reaction mixture with a Dean-Stark type trap.

The double cyclodehydration is brought about by dissolving a compound typified by Compound VIII in benzene containing a catalytic amount of p-toluene sulfonic acid and boiling the mixture under a Dean-Stark trap until two equivalents of water have been collected, or alternatively, by treating the same triketone with polyphosphoric acid at room temperature or slightly above until ring closure is complete.

The selective hydrogenation of the gona-8,14-dienes typified by compound IX is carried out by means of 2% pallidized calcium carbonate. As hereinbefore noted, suprisingly, the catalytic hydrogenation results in addition of hydrogen to the 14-double bond in such a way as to give the "natural" stereochemical configuration; that is, the hydrogen adds at 14-trans to the alkyl at 13. Selective reduction of the 14-ethylenic linkage is achieved by use of catalyst-solvent combination which shows adequate selectively, and stopping the hydrogenation when the theoretical amount of hydrogen has reacted. Solvents showing selectivity in this regard are the nonprotonic solvents, that is, hydrocarbons and ethers; benzene, toluene, naphtha, dioxan, dibutyl ether, and diethyl ether are examples of suitable nonprotonic solvents. On the other hand, protonic solvents such as acetic acid and ethanol appears to be largely non-selective.

It has been found that a moderately active Raney nickel catalyst provides good selectivity in a suitable solvent. If a Raney nickel catalyst of low activity is employed, the hydrogenation may be too slow to be useful; on the other hand, a vigorous catalyst shows poor selectivity, and some saturation of the 8,9-ethylenic bond may occur simultaneously with the hydrogenation at the 14,15-position.

If desired, other moderately active hydrogenation catalysts may be used instead of Raney nickel; for example, palladium on barium sulfate or on an alkaline earth metal carbonate or on charcoal have all been found suitable in this selective hydrogenation.

Saturation at the 8- or at the 9(11)-position of the tetracyclic structures must be stereospecific to obtain the natural type of exocyclic substituent configuration as noted supra. Such a sufficiently stereospecific reduction can be in general effected by the action of an alkali metal (sodium, potassium, or lithium) in liquid ammonia to give the normal stereoid configuration hydrogen at the respective carbons. Preferably this type of reduction is carried out in the presence of a primary or secondary aromatic amine, for instance aniline, p-toluidine, or diphenylamine, as this can improve the yield of the desired product. The reduction can be carried out in the presence of a more reactive proton donor: in this instance, the reduction of the ethylenic linkage occurs with a simultaneous reduction of the aromatic ring to give a 1,4-dihydrophenyl group.

The reduction of 9-dehydro compounds can also be effected by catalytic hydrogenation, as this has been discovered to be sufficiently stereospecific for production of the desired trans-anti-trans compounds of normal configuration.

While the tetracyclic compounds in this specification and the appended examples are named to describe the configuration corresponding to that of the natural steroids, it is to be understood that unless otherwise indicated, the product of each of the given manipulative procedures is a racemic mixture which contains said named compound and its enantiomorph.

The following preparations illustrate the manner of making the chemical compounds which are the starting materials for use in the processes of the invention.

PREPARATION 1

3-(3-methoxyphenyl)-n-propyl bromide

Cool 3-(3-methoxyphenyl) propan-1-ol (125 g.) in benzene (200 cc.) to 0° and add a solution of phosphorus tribromide (86 g.) in benzene (150 cc.) dropwise so that the temperature of the mixture does not rise above 5°. Keep the mixture at 0° for 1 hour and then heat to 60° for 3 hours. Cool, pour onto ice, dilute with ether and separate the organic layer. Wash the organic solution with 3 N aqueous sodium hydroxide, water and dry. Remove the solvent and distill the residue to obtain the title compound (131 g.), B.P. 146–148°/17 mm. $n_D^{18}$ 1.5497.

Calcd. for $C_{10}H_{13}BrO$ (percent): C, 52.4; H, 5.7; Br, 34.8. Found (percent): C, 54.4; H, 5.7; Br, 34.7.

PREPARATION 2

5-m-methoxyphenylpent-1-yne

Add 3-(3-methoxyphenyl)-n-propyl bromide (14 g.) in tetrahydrofuran (15 cc.) with rapid stirring to a solution of sodium acetylide (from 1.84 g. sodium) in liquid ammonia (125 cc.) in a Dewar flask. Continue stirring for 22 hours, then add ammonium chloride (3 g.) and water (50 cc.). Collect the product with ether and wash and dry the ethereal solution. Distill to obtain 5-m-methoxyphenylpent-1-yne (7.1 g., 66%), B.P. 75–78°/0.06 mm. Hg.

Calcd. for $C_{12}H_{14}O$ (percent): C, 82.7; H, 8.1. Found (percent): C, 82.2; H, 7.8.

PREPARATION 3

1-diethylamino-6-m-methoxyphenylhex-2-yne

Allow 5-m-methoxyphenylpent-1-yne (8 g.) to stand for 12 hours at 70° C. under nitrogen with water (2.5 cc.), trioxan (0.5 g.) 30% formalin (5.5 g.), diethylamine (4 g.), acetic acid (2.75 g.), dioxan (25 cc.) and cuprous chloride (0.13 g.). Make the cooled solution alkaline with 10% aqueous sodium hydroxide and extract with ether; then extract the ether extract with 10% hydrochloric acid; wash the acid extract with ether, make alkaline with 10% aqueous sodium hydroxide, extract with ether, and then wash and dry the ether extract. Distill to obtain 1-diethylamino-6-m-methoxyphenylhex-2-yne (10.6 g., 88%), B.P. 130–131° C./0.1 mm.

Calcd. for $C_{17}H_{25}N$ (percent): C, 78.7; H, 9.7. Found (percent): C, 78.9; H, 9.6.

PREPARATION 4

1-diethylamino-6-m-methoxyphenylhexan-3-one and 6-m-methoxyphenylhex-1-en-3-one Add mercuric sulphate (0.45 g.) to a swirled solution of 1-diethylamino-6-m-methoxyphenylhex-2-yne (8.5 g.) in concentrated sulphuric acid (2.5 cc.) and water (25 cc.). Keep the solution under nitrogen at 75° C. for 1 hour, then cool, make basic with 10% aqueous sodium hydroxide, and filter through glass wool to remove mercuric oxide. Extract product with ether and wash and dry the ethereal solution. Remove the solvent to obtain the crude ketoamine 1-diethylamino-6-m-methoxyphenylhexan-3-one, infrared absorption peak at 1710μ. Distill under reduced pressure with partial elimination of diethylamine, to obtain a mixture of the ketoamine 1-diethylamino-6-m-methoxyphenylhexan-3-one and the vinyl ketone 6-m-methoxyphenylhex-1-en-3-one, (7.1 g., ca. 76%), B.P. 140–145° C./0.1 mm.; infrared absorption peaks at 5.85 and 5.95μ, the ketoamine predominating.

PREPARATION 5

2-(6-m-methoxyphenyl-3-oxohexyl)-2-ethylcyclopentane-1,3-dione

Reflux a mixture (5.25 g.) of 1-diethylamino-6-m-methoxyphenylhexan-3-one and 6-m-methoxyphenylhex-1-en-3-one with 2-ethylcyclopentane-1,3-dione, (3.3 g.) in dry 0.12% methanolic solution of potassium hydroxide for 18 hours. Filter the resulting solution, evaporate to dryness and dissolve the residue in ether. Wash the ether solution with alkali, hydrochloric acid, and water, dry and evaporate to obtain as residue the triketone 2-(6-m-methoxyphenyl - 3 - oxohexyl)-2-ethylcyclopentane-1,3-dione (7.1 g.) as a gum.

PREPARATION 6

13β-ethyl-3-methoxygona-1,3,5(10),8,14-pentaen-17-one

Reflux the triketone 2-ethyl-2-(6-m-methoxyphenyl-3-oxohexyl)-cyclopentane-1-3-dione (7.1 g.), in benzene (150 cc.) and toluene-p-sulphonic acid (2 g.) until the theoretical amount of water (0.72 cc.) for double cyclodehydration has been collected in a Dean-Stark separator. Wash the cooled reaction mixture after removal of solvent under reduced pressure, B.P. ca. 220°/0.01 mm., to obtain an almost colorless glass (5.7 g.). Crystallize the glass from methanol containing a little ethyl acetate to obtain pure 13β-ethyl-3-methoxygona-1,3,5(10),8,14-pentaen-17-one (3.7 g.), M.P. 77–80°; ultraviolet absorption peak at 311 mμ (ε 28,000).

Calcd. for $C_{20}H_{22}O_2$ (percent): C, 81.6; H, 7.5. Found (percent): C, 81.3; H, 7.3.

PREPARATION 7

13β-ethyl-3-methoxygona-1,3,5(10),8-tetraen-17-one

Dissolve 13β - ethyl - 3 - methoxygona-1,3,5(10),8,14-pentaen-17-one (2 g.) in dioxan (50 cc.) containing Raney nickel (ca. 0.5 g.) of moderate activity and shake with hydrogen until 160 cc., the amount corresponding to one molecular proportion has been absorbed. Recrystallize the isolated product from methanol to obtain the title product (1.2 g.), M.P. 110–115°; ultraviolet absorption peak at 280 mμ (ε 13,200).

PREPARATION 8

13β-ethyl-3-methoxygona-1,3,5(10),8-tetraen-17β-ol

Add 13β-ethyl - 3 - methoxygona-1,3,5(10),8-tetraen-17-one (16.8 g.) to a solution of sodium borohydride (6 g.) in methanol (500 cc.), swirl the mixture which boils spontaneously. When all the material has been added and the reaction has subsided, add acetic acid (15 cc.). Reduce the mixture in volume by evaporation of most of the solvent, add water and extract the product with ether. Evaporate the washed and dried extracts to obtain crude crystalline product (16.8 g.), M.P. 102–105° on recrystallization from acetonitrile.

PREPARATION 9

13β-ethyl-3-methoxygona-1,3,5(10)-trien-17β-ol

To 13β - ethyl-3-methoxygona-1,3,5(10),8-tetraen-17β-ol (16.8 g.) dissolved in a mixture of aniline (150 cc.) and tetrahydrofuran (50 cc.) add liquid ammonia (400 cc.). Add lithium metal (6.0 g.) gradually in small pieces during 10 minutes, and stir the blue suspension obtained. After 2 hours, add ammonium chloride (50 g.) to the reaction mixture until a clear solution is obtained; then add water (600 cc.) and extract the mixture with ether. Evaporate the washed and dried extracts to obtain as residue a crystalline solid. Recrystallize from hexane (300 cc.), to obtain 13β-ethyl-3-methoxygona-1,3,5(10)-trien-17β-ol (14 g.), M.P. 126–130°.

The following processes illustrate the manner of using the claimed processes of the invention for the preparation of the claimed composition of the invention.

EXAMPLE 1

13β-methyl - 3-methoxy-D - homo-gona - 2,5(10)-dien-17aβ-ol

Add 13β-methyl - 3-methoxy-D - homo-gona-1,3,5(10)-trien-17aβ-ol (13 g.) in tetrahydrofuran (300 cc.) to liquid ammonia (650 cc.) followed by the addition of lithium (4.3 g.). After stirring for 30 minutes add absolute ethanol dropwise over a period of 1 hour to discharge the blue color. Precipitate the product with water, filter and dry to give 13β-methyl-3-methoxy-D-homo-gona-2,5(10)-dien-17aβ-ol; M.P. 148–155°; infrared absorption peaks at 2.98μ, 5.88μ and 5.98μ.

EXAMPLE 2

13β-ethyl-3-methoxy-D-homa-gona-2,5(10)-dien-17aβ-ol

Add 13β - ethyl-D-homo - 3 - methoxygona - 1,3,5(10)-trien-17aβ-ol (24.4 g.) tetrahydrofuran (200 cc.) to liquid ammonia (1000 cc.) containing tetrahydrofuran (300 cc.). Add lithium metal (7.0 g.) portionwise and stir for 1.5 hours. Add absolute ethanol dropwise until the blue color is discharged, followed by water. Boil the precipitated solid with methanol (200 cc.) and chill. Filter and dry to obtain the title compound (20.5 g.), M.P. 141–143°, $\nu_{max.}$ KBr 3.05, 5.88, 5.97μ.

EXAMPLE 3

13β-ethyl-3-methoxygona-2,5(10)-dien-17β-ol

Add 13β - ethyl-3 - methoxygona - 1,3,5(10) - trien-17β-ol (0.5 g.) in tetrahydrofuran (50 cc.) to stirred liquid ammonia (150 cc.), followed by lithium foil (0.5 g.) and then add ethanol (6 cc.) during 20 minutes. When blue color is discharged, and water and work up the product with ether to yield 13β-ethyl-3-methoxy-gona-2,5(10)-dien-17β-ol as a solid (0.47 g.).

To prepare 13β-ethyl-2,3-dimethoxy-gona-2,5(10)-dien-17β-ol react 13β-ethyl-2,3 - dimethoxy-gona-1,3,5(10)-trien-17β-ol in tetrahydrofuran with lithium in liquid ammonia according to the manipulative procedure described above.

To prepare 13β-ethyl-1,3-dimethoxy-gona-1(10),3-dien-17β-ol react 13β-ethyl-1,3-dimethoxy - gona - 1,3,5(10)-trien-17β-ol in tetrahydrofuran with lithium in liquid ammonia according to the manipulative procedure described above.

To prepare 13β-ethyl-3-ethoxy-gona-2,5(10)-dien-17β-ol react 13β-ethyl-3-ethoxy-gona-1,3,5(10)-trien-17β-ol in tetrahydrofuran with lithium in liquid ammonia according to the manipulative procedure described above.

To prepare 13β-phenethyl - 3-n-propoxy - gona 2,5(10)-dien-17β-ol react 13β-phenethyl-3 - n-propoxy - gona - 1,3,5(10)-trien-17β-ol in tetrahydrofuran with lithium in liquid ammonia according to the manipulative procedure described above.

To prepare 13β-isobutyl - 3-n - pentoxy-gona - 2,5(10)-dien-17β-ol react 13β-isobutyl - 3-n-pentoxy - gona-1,3,5(10)-trien-17β-ol in tetrahydrofuran with lithium in liquid ammonia according to the manipulative procedure described above.

To prepare 13β-(3-hydroxypropyl) - 3-cyclopentoxy-gona-2,5(10) - dien-17β-ol react 13β-(3-hydroxypropyl)-3-cyclopentoxy-gona-1,3,5(10)-trien-17β-ol in tetrahydrofuran with lithium in liquid ammonia according to the manipulative procedure described above.

To prepare 13β-(3-dimethylaminopropyl) - 1,3 - dimethoxy-gona - 1(10),3-dien - 17β-ol react 13β-(3-dimethylaminopropyl)-1,3 - dimethoxy - gona-1,3,5(10) - trien-17β-ol in tetrahydrofuran with lithium in liquid ammonia according to the manipulative procedure described above.

EXAMPLE 4

13β-ethyl-3-methoxy-gona-2,5(10)-dien-17β-ol

To 13β-ethyl - 3-methoxy-gona - 1,3,5(10) - trien-17β-ol (1.0 g.) in 1-methoxypropan-2-ol (100 cc.) add liquid ammonia (200 cc.) followed by lithium metal (1.2 g.) in small pieces with stirring. After discharge of the blue color add in excess of ammonium chloride, followed by water; filter off the crude 13β-ethyl-3-methoxy-gona-2,5(10)-dien-17β-ol and dry, M.P. 98–104°. No selective ultra-violet absorption beyond 220 mμ; infrared absorption peaks at 3.03, 5.92, 6.01μ.

EXAMPLE 5

13β-ethyl-3-methoxy-gona-2,5(10)-dien-17β-ol

Add 13β-ethyl - 3-methoxy-gona - 1,3,5(10),8 - tetraen-17β-ol (1.0 g.) in 1-methoxypropan-2-ol (100 cc.) to liquid ammonia (150 cc.), followed by lithium metal (2.0 g.) in small pieces during 20 minutes with stirring. Discharge the blue color immediately after completion of the metal addition; then add water, filter off the solid and recrystallize from methanol to give 13β-ethyl-3-methoxy-gona-2,5(10)-dien-17β-ol (0.3 g.). No selective ultra-violet absorption beyond 220 mμ; infrared absorption peaks at 3.08, 5.92, 6.01μ.

EXAMPLE 6

13β-n-propyl-3-methoxy-gona-2,5(10)-dien-17β-ol

Dissolve 13β-n-propyl - 3-methoxy-gona - 1,3,5(10)-gona-trien-17β-ol in a mixture of freshly distilled pyrrole (50 cc.) and liquid ammonia (100 cc.) and then add lithium (1.0 g.) in small pieces as quickly as the production of foam permits. When the blue color is discharged, add excess ammonium chloride, followed by water (100 cc.). Extract the product into ether, wash, dry and evaporate. Recrystallize the residue (0.9 g.), from methanol, to give 13β-n-propyl - 3-methoxy - gona-2,5(10) - dien-17β-ol (0.65 g.), M.P. 153–6°; no selective ultra-violet absorption beyond 220 mμ; infrared absorption peaks at 2.91, 5.90, 6.04 mμ.

EXAMPLE 7

13β-isopropyl-3-methoxy-gona-2,5(10)-dien-17β-ol

Add liquid ammonia (100 cc.) to 13β-isopropyl-3-methoxy-gona-1,3,5(10)-trien-17β-ol (0.5 g.) in tetrahydrofuran (50 cc.) followed by lithium metal (0.5 g.), and stir the solution for 10 minutes. Then add ethanol (6 cc.) dropwise. When the blue color is discharged, add water and extract the product with ether. Evaporate the washed and dried extracts to give crude 13β-isopropyl-3-methoxy-gona-2,5(10)-dien-17β-ol (0.5 g.) as colorless gum.

EXAMPLE 8

13β-isopropyl-3-methoxy-gona-2,5(10)-dien-17β-ol

Add a solution of 13β-isopropyl-3-methoxy-gona-1,3,5(10),8-tetraen-17β-ol (0.25 g.) in a mixture of dry ether (10 cc.) and dry tetrahydrofyran (10 cc.) to liquid ammonia (50 cc.) containing dissolved lithium metal (0.125 g.). Then add further lithium (0.125 g.), followed after 5 minutes by dropwise addition of ethanol (5 cc.) over 10 minutes. When the blue color is discharged, add water and extract the product with ether. Evaporate the washed and dried extracts and recrystallize the partially crystalline residue from ethanol to give 13β-isopropyl-3 - methoxy-gona-2,5(10)-dien-17β-ol (0.01 g.), M.P. 87–94°; infrared absorption peaks at 2.94, 5.92, 5.99μ.

EXAMPLE 9

13β-n-butyl-3-methoxy-gona-2,5(10)-dien-17β-ol

Add 13β-n-butyl-3-methoxy-gona-1,3,5(10)-trien-17β-ol (0.5 g.) in a mixture of tetrahydrofuran (5 cc.) and ether (15 cc.) dropwise to a stirred solution of lithium (0.5 g.) in liquid ammonia (60 cc.). After 5 minutes beyond completion of addition, add ethanol (8 cc.) dropwise and when the blue color is discharged, add water and extract the mixture with ether. Work up in the usual way to give 13β-n-butyl-3-methoxy-gona-2,5(10)-dien-17β-ol as a crystalline solid, M.P. 135–9°; infrared absorption peaks at 2.97, 6.25, 6.38, and 8.16μ.

EXAMPLE 10

13β-isobutyl-3-methoxy-gona-2,5(10)-dien-17β-ol

To a mixture of distilled liquid ammonia (900 cc.), 1-methoxy-2-propanol (430 cc.), and 13β-isobutyl-3-methoxy-gona-1,3,5(10),8-tetraen-17β-ol add lithium (5.7 g.) in small pieces, little by little, with vigorous stirring; a blue color develops which disappears when the addition of lithium is complete. Continue stirring for an additional 30 minutes. Thereafter, add water (145 cc.). Collect the precipitate, wash with water and dry, thus giving 13β-isobutyl-3-methoxy-gona-2,5(10) - dien - 17β - ol (4.0 g.: 80%), M.P. 124–127° C.; infrared absorption peaks at 5.89, 6.03μ.

EXAMPLE 11

13β-ethyl-3-ethoxy-gona-2,5(10)-dien-17β-ol

Heat under reflux 13β-ethyl-3-hydroxy-gona-1,3,5(10)-trien-17β-ol (1.75 g.) and potassium carbonate (3 g.) for six hours with ethanol (40 cc.) and ethyl iodide (20 cc.) in a nitrogen atmosphere. Then concentrate the solution to half its original volume, add water and take the product up in ether. Wash, dry and evaporate the ethereal solution and recrystallize the residue from hexane to give 13β-ethyl-3-ethoxy-gona-1,3,5(10)-trien-17β-ol. Add this product (0.5 g.) tetrahydrofuran (50 cc.) to liquid ammonia (100 cc.) and add lithium (0.5 g.). After stirring for 10 minutes add a mixture of ethanol (6 cc.) and tetrahydrofuran (10 cc.) over a period of 20 minutes, and when the blue color is lischarged add water and extract the mixture with ether. Wash, dry and evaporate the ethereal solution and recrystallize the residue from ethanol to give 13β-ethyl-3-ethoxy-gona-2,5(10)-dien-17β-ol. No selective ultraviolet absorption beyond 220 mμ.

EXAMPLE 12

13β-ethyl-3,17β-dimethoxygona-2,5(10)-diene

Add 13β-ethyl-3,17β-dimethoxygona-1,3,5(10)-triene (1 g.) in tetrahydrofuran (10 cc.) to a stirred solution of liquid ammonia (35 cc.) and tetrahydrofuran (10 cc.), followed by the addition of lithium (0.7 g.) in pieces. After stirring vigorously for 2 hours add ethanol dropwise until the blue color is discharged. Add water and extract the mixture with ether-benzene. Wash the organic solution with water, aqueous sodium bicarbonate, water and brine and dry (Na₂SO₄). Remove the solvent under reduced pressure and triturate the residue with methanol. Filter to obtain crude title product contaminated with some starting material (0.8 g.), M.P. 144–150°; infrared absorption peaks at 5.9, 6.0μ.

EXAMPLE 13

13β-ethyl-3-n-propoxy-gona-2,5(10)-dien-17β-ol

Use n-propyl iodide (20 cc.) instead of ethyl iodide and proceed exactly as described for the 3-ethoxy compound to give 13β-ethyl-3-n-propoxy-gona-2,5(10)-dien-17β-ol; no selective ultra-violet absorption beyond 220 mμ.

EXAMPLE 14

13β-methyl-3-methoxy-D-homo-gona-2,5(10)-dien-17a-one

Reflux 13β-methyl - 3 - methoxy-D-homo-gona-2,5(10)-dien-17aβ-ol (4 g.) under nitrogen in toluene (130 cc.) containing cyclohexanone (40 cc.) and aluminum isopropylate (1.8 g.) for 3 hours. Cool, add water (40 cc.) followed by anhydrous sodium sulphate (40 g.) and filter the mixture. Evaporate the filtrate to dryness, first at 30°/20 mm. then at 50°/0.1 mm. to afford 13β-methyl-3-methoxy-D-homo-gona-2,5(10)-dien-17a-one. Infrared absorption peaks at 5.85, 5.92, 6.01μ.

EXAMPLE 15

13β-ethyl-3-methoxy-D-homo-gona-2,5(10)-dien-17a-one

Reflux 13β - ethyl - 3 - methoxy-D-homo-gona-2,5(10)-dien-17aβ-ol (10 g.) with aluminum isopropylate (8 g.) in dry toluene (450 cc.) and dry cyclohexanone (140 cc.) for 4 hours in an atmosphere of nitrogen. Decompose the cooled solution with water (ca. 25 cc.) and dry by the addition of sodium sulphate. Filter the mixture and remove the solvents first at 20 mm. Hg and then at 90°/0.2 mm. Hg. Dry the residue over phosphorus pentoxide in a desiccator to give 13β-ethyl-3-methoxy-D-homo-gona-2,5 (10)-dien-17a-one (11.1 g.), M.P. 138–145° C.; infrared absorption peaks at 5.88, 6μ.

EXAMPLE 16

13β-ethyl-3-methoxy-gona-2,5(10)-dien-17-one

Reflux a mixture of 13β-ethyl-3-methoxy-gona-2,5(10)-dien-17β-ol (0.8 g.) aluminum isopropoxide (0.36 g.), toluene (26 cc.) and cyclohexanone (8 cc.) under nitrogen for 3 hours. Allow the solution to cool under nitrogen, add water (5 cc.) and shake the mixture vigorously. Add anhydrous sodium sulphate (5 g.), shake the mixture again and then allow to stand for 30 minutes. Filter the solution, combine the filtrate with ether washings of the residue, and evaporate, first at 30°/20 mm., then at 50°/0.1 mm. to leave as a crystalline solid, 13β-ethyl-3-methoxy-gona-2,5(10)-dien-17-one; infrared absorption peaks at 5.78, 5.92, 6.01μ, with no absorption due to hydroxyl.

To prepare 13β-n-propyl-3-methoxy-gona-2,5(10)-dien-17-one react 13β-n-propyl-3-methoxy-gona-2,5(10)-dien-17β-ol in toluene with cyclohexanone and aluminum isopropoxide according to the manipulative procedure described above.

To prepare 13β-isopropyl - 3 - methoxy - gona-2,5(10)-dien-17-one react 13β-isopropyl-3-methoxy-gona-2,5(10)-dien-17β-ol in toluene with cyclohexanone and aluminum isopropoxide according to the manipulative procedure described above.

To prepare 13β-isobutyl-3-methoxy-gona-2,5(10)-dien-17 - one react 13β-isobutyl-3-methoxy-gona-2,5(10)-dien-17β-ol in toluene with cyclohexanone and aluminum isopropoxide according to the manipulative procedure described below.

To prepare 13β - ethyl-3-ethoxy-gona-2,5(10)-dien-17-one react 13β-ethyl-3-methoxy-gona-2,5(10)-dien 17β-ol in toluene with cyclohexanone and aluminum isopropoxide according to the manipulative procedure described above.

To prepare 13β-ethyl-3-n-propoxy-gona-2,5(10)-dien-17 - one react 13β - ethyl-3-n-propoxy-gona-2,5(10)-dien-17β-ol in toluene with cyclohexanone and aluminum isopropoxide according to the manipulative procedure described above.

To prepare 13β-ethyl-2,3-dimethoxy-gona-2,5(10)-dien-17-one react 13β-ethyl-2,3-dimethoxy-gona-2,5(10)-dien-17β-ol in toluene with cyclohexanone and aluminium isopropoxide according to the manipulative procedure described above.

To prepare 13β-ethyl-1,3-dimethoxy-gona-1(10),3-dien-17-one react 13β-ethyl-1,3-dimethoxy-gona-1(10),3-dien-17β-ol in toluene with cyclohexanone and aluminium isopropoxide according to the manipulative procedure described above.

To prepare 13β-phenethyl-3-n-propoxy-gona-2,5(10)-dien - 17 - one react 13β-phenethyl-3-n-propoxy-gona-2,5(10)-dien-17β-ol in toluene with cyclohexanone and aluminium isopropoxide according to the manipulative procedure described above.

To prepare 13β-isobutyl-3-n-pentoxy-gona-2,5(10)-dien-17-one react 13β-isobutyl-3-n-pentoxy-gona-2,5(10)-dien-17β-ol in toluene with cyclohexanone and aluminium isopropoxide according to the manipulative procedure described above.

To prepare 13β - (3 - hydroxypropyl)-3-cyclopentoxy-gona-2,5(10)-dien-17-one react 13β-(3-hydroxypropyl)-3-cyclopentoxy-gona-2,5(10)-dien-17β-ol in toluene with cyclohexanone and aluminium isopropoxide according to the manipulative procedure described above.

To prepare 13β - (3-dimethylaminopropyl)-1,3-dimethoxy-gona-1(10),3-dien-17-one react 13β-(3-dimethylaminopropyl)-1,3-dimethoxy-gona-1(10),3-dien-17β-ol in toluene with cyclohexanone and aluminium isopropoxide according to the manipulative procedure described above.

EXAMPLE 17

13β-n-propyl-3-methoxy-gona-2,5(10)-dien-17-one

Reflux 13β-n-propyl-3-methoxy-gona-2,5(10)-dien-17β-ol (3.0 g.) with aluminium isopropoxide in toluene and cyclohexanone according to the conditions of Oppenauer oxidation. Isolate and recrystallize the product from methanol to give 13β-n-propyl-3-methoxy-gona-2,5(10)-dien-17-one (2.0 g.), M.P. 128–131° C. with softening at 125° C.

Calcd. for $C_{21}H_{30}O_2$ (percent): C, 80.2; H, 9.6. Found (percent): C, 80.0; H, 9.55.

EXAMPLE 18

13β-n-butyl-3-methoxygona-2,5(10)-dien-17-one

Reflux 13β-n-butyl-3-methoxy-gona-2,5(10)-dien-17β-ol (8 g.) in toluene (450 cc.) containing cyclohexanone (120 cc.) and aluminium isopropoxide (5 g.) under nitrogen for 4 hours. Cool, and add water (15 cc.) dropwise, followed by anhydrous sodium sulphate. Filter the mixture, wash the residue with ether and combine the filtrate and washings, dry and evaporate finally at 90°/1.05 mm. to give 13β - n - butyl-3-methoxy-gona-2,5(10)-dien-17-one (6.0 g.), M.P. 124–128° (from methanol); infrared absorption peaks at 5.80 and 6.02μ.

EXAMPLE 19

13β-ethyl-3-methoxy-17,17-ethylenedioxy-gona - 2,5(10)-diene

Add lithium (0.5 g.) in small pieces to 13β-ethyl-3-methoxy-17,17-ethylenedioxy-gona-1,3,5(10),8 - tetraene (0.5 g.) in a mixture of 1-methoxy-propan-2-ol (70 cc.), anhydrous liquid ammonia (120 cc.) and tetrahydrofuran (25 cc.) with continuous stirring. On completion of the reaction allow the ammonia to evaporate; then add water and extract the mixture with benzene. Wash the benzene extracts, dry and evaporate the solvent and crystallize the oily residue from methanol to give 13β-ethyl-3-methoxy-17,17-ethylenedioxy-gona-2,5(10)-diene (.2 g.); no selective ultra-violet absorption beyond 220 mμ; infrared absorption peaks at 5.90, 6.01μ.

Calcd. for $C_{22}H_{32}O_3$ (percent): C, 76.8; H, 9.3. Found (percent): C, 76.8; H, 9.4.

To prepare 13β-ethyl-3-methoxy-17,17-ethylenedioxy-gona-2,5(10)-diene reduce 13β - ethyl-3-methoxy - 17,17-ethylenedioxy-gona-1,3,5(10)-triene according to the manipulative procedure described above.

To prepare 13β-n-propyl-3-methoxy-17,17-ethylenedioxy-gona-2,5(10)-diene reduce 13β-n-propyl-3-methoxy-17,17-ethylenedioxy-gona-1,3,5(10)-triene according to the manipulative procedure described above.

To prepare 13β-isopropyl-3-methoxy-17,17-ethylenedioxy-gona-2,5(10)-diene reduce 13β-isopropyl-3-methoxy-17,17-ethylenedioxy-gona-1,3,5(10)-triene according to manipulative procedure described above.

To prepare 13β-n-butyl-3-methoxy-17,17-ethylenedioxy-gona-2,5(10)-diene reduce 13β-n-butyl-3-methoxy-17,17-ethylenedioxy-gona-1,3,5(10)-triene according to the manipulative procedure described above.

To prepare 13β-isobutyl-3-methoxy-17,17-ethylenedioxy-gona-2,5(10)-diene reduce 13β-isobutyl-3-methoxy-17,17-ethylenedioxy-gona-1,3,5(10)-triene according to the manipulative procedure described above.

To prepare 13β - ethyl-3-ethoxy-17,17 - ethylenedioxy-gona-2,5(10)-diene reduce 13β-ethyl-3-ethoxy-17,17-ethylenedioxy-gona-1,3,5(10)-triene according to the manipulative procedure desscribed above.

To prepare 13β-ethyl-3-n-propoxy-17,17-ethylenedioxy-gona-2,5(10)-diene reduce 13β-ethyl-3-n-propoxy-17,17-ethylenedioxy-gona-1,3,5(10)-triene according to the manipulative procedure described above.

To prepare 13β - ethyl-2,3-dimethoxy-17,17-ethylenedioxy-gona-2,5(10)-diene reduce 13β-ethyl-2,3-dimethoxy-17,17-ethylenedioxy-gona-1,3,5(10)-triene according to the manipulative procedure described above.

To prepare 13β-ethyl-1,3-dimethoxy-17,17-ethylenedioxy-gona-1(10),3-diene reduce 13β-ethyl-1,3-dimethoxy-17,17-ethylenedioxy-gona-1,3,5(10)-triene according to the manipulative procedure described above.

To prepare 13β-phenethyl-3-n-propoxy-17,17-ethylenedioxy-gona-2,5(10)-diene reduce 13β-phenethyl-3-n-propoxy-17,17-ethylenedioxy-gona-1,3,5(10)-triene according to the manipulative procedure described above.

To prepare 13β-(3-hydroxypropyl)-3-cyclopentoxy-17,17-ethylenedioxy-gona-2,5(10)-diene reduce 13β-(3-hydroxypropyl)-3-cyclopentoxy-17,17 - ethylenedioxy-gona-1,3,5(10)-triene according to the manipulative procedure described above.

To prepare 13β-(3-dimethylaminopropyl)-3-methoxy-17,17-ethylenedioxy-gona-2,5(10)-diene reduce 13β-(3-dimethylaminopropyl)-3-methoxy-17,17 - ethylenedioxy-gona-1,3,5(10)-triene according to the manipulative procedure described above.

EXAMPLE 20

13β-methyl - 3 - methoxy-17aα - ethyl-D-homo-gona - 2,5(10)-dien-17aβ-ol

Add ethanol (6 cc.) dropwise with stirring to a solution of 13β-methyl-3-methoxy-17aα-ethyl-D-homo-gona-1,3,5(10)-trien-17aβ-ol (0.4 g.) in liquid ammonia (60 cc.), and tetrahydrofuran (15 cc.) containing lithium (0.4 g.). On completion of the reaction add water and extract the mixture with ether. Wash, dry and evaporate the extracts to give 13β-methyl-3-methoxy-17aα-ethyl-D-homo-gona-2,5(10) - dien - 17aβ - ol; infrared absorption peaks at 2.99, 5.90, 6.02μ.

EXAMPLE 21

13β-methyl - 3 - methoxy-17aα-ethynyl-D-homo-gona-2,5(10)-dien-17aβ-ol

Add a solution of 13β-methyl-3-methoxy-D-homo-gona-2,5(10)-diene-17a-one (6.5 g.) in dimethylacetamide (50 cc.) to a stirred suspension of lithium acetylide (4.25 g.) in dioxane (25 cc.), ethylene diamine diamine (1 cc.), and dimethylacetamide (25 cc.) in an atmosphere of acetylene. After stirring for 20 hours pour the mixture onto crushed ice (150 g.) and extract with benzene. Wash, dry and evaporate the extracts and recrystallize the residue from ethanol to give 13β-methyl-3-methoxy-17aα-ethynyl-D-homo-gona-2,5(10)-dien-17aβ-ol; infrared absorption peaks at 2.88, 3.05, 5.90, 6.01μ.

EXAMPLE 22

13β-ethyl-3-methoxy-17aα-ethynyl-D-homo-gona-2,5 (10)-dien-17aβ-ol

Dissolve 13β-ethyl-3-methoxy - D - homo-gona-2,5(10)-dien-17-one (8.8 g.) in dimethylacetamide (70 cc.) and add a suspension of lithium acetylide (10 g.) in ethylenediamine dioxan (1:1; 60 cc.). Then pass acetylene over the surface of the stirred mixture for 15 hours. Decompose the reaction mixture by pouring onto ice, collect the product in ether and evaporate the washed, dried ether solution to give 13β-ethyl-3-methoxy - 17aα - ethynyl - D-homo-gona-2,5(10)-dien-17aβ-ol; M.P. 118–124° (7 g.) 74%. Infrared absorption peaks at 2.85, 3.06, 5.90, 6.0μ.

EXAMPLE 23

13β-ethyl-3-methoxy-17aα-ethyl-D-homo-gona-2,5(10)-dien-17aβ-ol

Add a solution of 13β-ethyl-3-methoxy-17aα-ethyl-D-homo-gona-1,3,5(10)-trien-17aβ-ol (9 g.) in tetrahydrofuran (240 cc.) to a stirred solution of liquid ammonia (500 cc.) and then add lithium (3 g.) in portions. After 30 minutes discharge the blue color by the dropwise addition of ethanol, add water and filter off the precipitated product to give 13β-ethyl-3-methoxy-17aα-ethyl-D-homo-gona-2,5(10)-dien-17aβ-ol (8.7 g.); M.P. 161–166°. Infrared absorption peaks at 2.90, 5.90, 5.99μ.

EXAMPLE 24

13β-ethyl-3-methoxy-17α-methyl-gona-2,5(10)-dien-17β-ol

Add lithium (1.2 g.) in small pieces during 20 minutes, with stirring to 13β-ethyl-3-methoxy-17α-methyl-gona-1,3,5(10)-trien-17β-ol in a mixture of liquid ammonia (200 cc.), 1-methoxy-propan-2-ol (100 cc.) and tetrahydrofuran (250 cc.). On discharge of the blue color, allow the ammonia to evaporate, add excess ammonium sulphate, followed by water, and extract the mixture with benzene. Wash, dry and evaporate the extracts and crystallize the residue from methanol to yield 13β-ethyl-3-methoxy-17α-methyl-gona-2,5(10)-dien-17β-ol (0.59 g.), M.P. 151–155°; no selective ultra-violet absorption beyond 200 mμ; infrared absorption peaks at 2.99, 5.90, 6.04μ.

EXAMPLE 25

13β-ethyl-3-methoxy-17α-ethynyl-gona-2,5(10)-dien 17β-ol

Add a suspension of lithium aluminium acetylide obtained by passing excess acetylene through a solution of lithium aluminium hydride (2.0 g.) in tetrahydrofuran (25 cc.) with stirring to 13β-ethyl-3-methoxy-gona-2,5 (10)-dien-17-one (0.6 g.) in tetrahydrofuran (5 cc.). After standing for 18 hours, add ether (40 cc.), followed by the careful dropwise addition of water until effervescence ceases. Add anhydrous magnesium sulphate (10 g.) and filter the solution and evaporate the filtrate under reduced pressure to give 13β-ethyl-3-methoxy-17α-ethynyl-gona-2,5(10)-dien-17β-ol (90.6 g.). Infrared absorption peaks at 2.80, 3.05, 4.59, 6.00μ.

EXAMPLE 26

13β,17α-diethyl-3-methoxy-gona-2,5(10)-dien-17β-ol

Add a solution of 13β,17α-diethyl-3-methoxy-gona-1,3,5(10)-trien-17β-ol (0.40 g.) in a mixture of ether (10 cc.) and tetrahydrofuran (5 cc.) dropwise during 5 minutes to a stirred solution of lithium (0.40 g.) in liquid ammonia (60 cc.). After a further five minutes, add ethanol (6 cc.) dropwise and when the blue color is discharged add water and extract the mixture with ether. Wash, dry and evaporate the extracts and recrystallize the residue from ethanol to give 13β,17α-diethyl-3-methoxy-gona-2,5(10)-dien-17β-ol (0.29 g.), M.P. 168–171°.

EXAMPLE 27

13β,17α-diethyl-3-methoxy-gona-2,5(10)-dien-17β-ol

Add 13β,17α-diethyl-3-methoxy-gona-1,3,5(10),8-tetraen-17β-ol (2.0 g.) in 1-methoxypropan-2-ol (200 cc.) to liquid ammonia (400 cc.) and then add lithium (2.0 g.) in small pieces during 45 minutes with stirring. After discharge of the blue color, allow the ammonia to evaporate, add water (500 cc.) and ether (500 cc.), and separate the organic phase. Combine the organic phase with the ether extracts of the aqueous phase, wash, dry and evaporate and crystallize the residue from methanol to give 13β,17α-diethyl-3-methoxy-gona-2,5(10)-dien-17β-ol (1.0 g.); no selective ultra-violet absorption beyond 220 mμ; infrared absorption peaks at 5.88, 5.99μ.

EXAMPLE 28

13β,17α-diethyl-3-methoxy-gona-2,5(10)-dien-17β-ol

Add lithium (0.5 g.) in small pieces, with stirring, to 13β,17α-diethyl-3-methoxy-gona-1,3,5(10) - trien - 17β-ol (0.5 g.) in a mixture of liquid ammonia (100 cc.) and pyrrole (50 cc.). After discharge of the blue color, add water and extract the mixture with ether. Wash the extracts with water, brine and dry over anhydrous magnesium sulphate. Evaporate the solution under reduced pressure and recrystallize the residue from methanol to give 13β,17α-diethyl-3-methoxy-gona-2,5(10)-dien-17β-ol (0.35 g.), M.P. 175–177° (samples of this substance appear to melt within the range of 165–177°, it being rather unstable). No selective ultraviolet absorption beyond 220 mμ; infrared absorption peaks at 2.90, 5.90, 6.00μ.

EXAMPLE 29

13β-ethyl-3-methoxy-17α-propynyl-gona-2,5(10)-dien-17β-ol

Add 13β-ethyl-3-methoxy-gona-2,5(10)-dien-17-one (10 g.) to a solution of propynyl magnesium bromide prepared from magnesium (6 g.) and ethyl bromide (25 g.) in tetrahydrofuran (500 cc.) and propyne. Stir the mixture for 6 hours under reflux, cool and decompose with water (100 cc.). Add "Celite," filter the resultant sludge and wash the residue thoroughly with ether. Separate the organic phase in the filtrate, wash, dry and evaporate. Reflux the product in methanol for 20 minutes, cool and filter to give 13β-ethyl-3-methoxy-17α-propynyl-gona-2,5 (10)-dien-17β-ol (9.5 g.), M.P. 158–161° after softening at 144°; infrared absorption peaks at 2.90, 3.08, 4.50, 5.88, 6.00μ; no selective ultraviolet absorpiton beyond 220 mμ.

EXAMPLE 30

13β-ethyl-3-methoxy-17α-allyl-gona-2,5(10)-dien-17β-ol

Dissolve 13β-ethyl-3-methoxy-gona-2,5(10)-dien-17-one in tetrahydrofuran (100 cc.) and allyl bromide (11.5 g.), and add the solution dropwise to a refluxing suspension of magnesium (1 g.) in allyl bromide (0.6 g.) and tetrahydrofuran (50 cc.). Allow the mixture to reflux for 6 hours, and then add water (100 cc.) to the cooled solution followed by enough "Celite" to make a thick paste. Filter the mixture, wash the residue thoroughly with ether and separate the organic phase from the filtrate, wash, dry and evaporate the ether soluiton and crystallize the residue from methanol to give 13β-ethyl-3-methoxy-17α-allyl-gona-2,5(10)-dien-17β-ol (3.8 g.); infrared absorption peaks at 3.03, 5.88, 6.01, 6.10μ; no selective ultraviolet absorption beyond 220 mμ.

EXAMPLE 31

13β-ethyl-3-methoxy-17α-n-propyl-gona-2,5(10)-dien-17β-ol

Add lithium (0.75 g.) in small pieces during 10 minutes, with stirring, to 13β-ethyl-3-methoxy-17α-n-propylgona-1,3,5(10)-trien-17β-ol (0.74 g.) in a mixture of liquid ammonia (100 cc.) and ether (50 cc.). After stirring for 1 hour, add a further quantity of ether (50 cc.), followed by the dropwise addition of a mixture of ether (25 cc.) and ethanol (20 cc.) during 30 minutes. Allow the ammonia to evaporate, add water and extract the mixture with ether. Wash, dry and evaporate the ethereal extracts and crystallize the brown residue from methanol to yield 13β-ethyl-3-methoxy-17α-n-propyl-gona-2,5(10)-dien-17β-ol (0.575 g.), M.P. 127–133°. No selective ultraviolet absorption beyond 220 mμ; infrared absorption peaks at 3.00, 5.89, 6.01μ.

EXAMPLE 32

13β-ethyl-3-methoxy-17α-(2-isobutenyl)-gona-2,5(10)-dien-17β-ol

Add a suspension of 13β-ethyl-3-methoxy-gona-2,5(10)-trien-17-one (4 g.) in ether (500 cc.) and methallyl chloride (8 g.) to a Grignard solution, prepared from methallyl chloride (8 g.) and magnesium (20 g.) in ether (100 cc.), at such a rate that gentle reflux is maintained. Reflux the mixture for 4 hours and then decompose the cooled solution with water (ca. 100 cc.). Add "Celite," filter the resultant pasty mass and wash the residue thoroughly with ether. Separate the organic phase from the filtrate, and evaporate solvent to obtain 13β-ethyl-3-methoxy-17α - (2 - isobutenyl)-gona-2,5(10)-dien-17β-ol (4 g.). Infrared absorption peaks at 2.86, 5.88, 6.01, 6.10μ; no selective ultraviolet absorption beyond 22 mμ.

EXAMPLE 33

13β-n-propyl-3-methoxy-17α-methyl-gona-2,5(10)-dien-17β-ol

Add lithium (1.5 g.) in small pieces, with stirring, to 13β-n-propyl-3-methoxy - 17α - methyl - gona-1,3,5(10)-trien-17β-ol (1.76 g.) in a mixture of liquid ammonia (170 cc.) and pyrrole (85 cc.). After 1 hour add an excess of ammonium chloride, followed by water, work up the mixture with ether, and recrystallize the product from methanol to give 13β-n-propyl-3-methoxy-17α-methyl-gona-2,5(10)-dien-17β-ol (1.36 g.), M.P. 157–160°. No aromatic ultraviolet absorption.

EXAMPLE 34

13β-n-propyl-3-methoxy-17α-ethynyl-gona-2,5(10)-dien-17β-ol

Add a solution of 13β-n-propyl-3-methoxy-gona-2,5(10)-dien-17-one (1.74 g.) in dry tetrahydrofuran (25 cc.) slowly to a stirred suspension of acetylene dimagnesium bromide (from magnesium, 0.36 g.) in tetrahydrofuran. After completion of the reaction decompose the Grignard complex with saturated ammonium chloride solution (100 cc.), and work up the product by means of ethyl acetate, purify by chromatography on neutral alumina, and recrystallize from methanol to give 13β-n-propyl-3-methoxy - 17α - ethynyl - gona - 2,5(10)-dien-17β-ol (0.33 g.), M.P. 91–96° (decomp.); infrared absorption peaks at 3.77, 3.03, 5.88, 5.99μ (a hydroxyl, a methine group and a dihydro-anisole system).

EXAMPLE 35

13β-n-propyl-3-methoxy-17α-ethyl-gona-2,5(10)-dien-17β-ol

Add lithium (1.0 g.) in small pieces, with stirring to 13β-n-propyl-3-methoxy-17α - ethyl-gona-1,3,5(10)-trien-17β-ol (0.90 g.) in a mixture of liquid ammonia (100 cc.) and pyrrole (60 cc.). After 30 minutes, add an excess of ammonium chloride, followed by water (100 cc.), and extract the mixture with ether. Wash the ether extracts with water, then with brine to dry the solution and evaporate under reduced pressure to give a crystalline residue; infrared absorption peaks at 3.06–3.10, 5.91, 6.02μ. Boil this residue with methanol (50 cc.) to leach out impurities and keep at −10° overnight, filter off the product and dry in vacuo over phosphorus pentoxide, as 13β-n-propyl-3-methoxy-17α - ethyl - gona-2,5(10)-dien-17β-ol (0.875 g.), M.P. 114–125°; no selective ultraviolet absorption beyond 220 mμ.

EXAMPLE 36

13β-n-propyl-3-methoxy-17α-allyl-gona-2,5(10)-dien-17β-ol

Warm allyl bromide (4.5 cc.) with magnesium turnings (107 g.) in ether (40 cc.) and then add 13β-n-propyl-3-methoxy-gona-2,5(10)-dien-17-one (2 g.) in ether (70 cc.) containing allyl bromide (2.5 cc.) slowly with stirring. Reflux the mixture with stirring for 3 hours, and to the cooled mixture add aqueous sodium potassium tartrate and extract the product with ether. Wash, dry and evaporate the ether extracts to give a residue which is mainly 13β-n-propyl-3-methoxy-17α-allyl - gona-2,5(10)-dien-17β-ol.

EXAMPLE 37

13β-n-propyl-3-methoxy-17α-propynyl-gona-2,5(10)-dien-17β-ol

Add a solution of 13β-n-propyl-3-methoxy-gona-2,5(10)-dien-17-one (7.5 g.) in tetrahydrofuran (250 cc.) with stirring under nitrogen to propynyl magnesium bromide from ethyl magnesium bromide 39 g., and propyne in tetrahydrofuran (500 cc.). Reflux the mixture with stirring for 3 hours, and on cooling add saturated aqueous ammonium chloride (120 cc.) and extract the product obtained with ether. Wash, dry the extracts and evaporate the ether. Dissolve the residue in boiling methanol and store for 18 hours at −10°. Filter off the crystalline deposit to yield 13β-n-propyl-3-methoxy-17α-propynyl-gona-2,5(10)-dien-17β-ol (6.9 g.), M.P. 104–111°.

To prepare 13β-isobutyl-3-methoxy-17α-ethyl-gona-2,5(10)-dien-17β-ol treat 13β-isobutyl-3-methoxy-gona-2,5(10)-dien-17-one with ethyl magnesium bromide according to the manipulative procedure described above.

To prepare 13β-isobutyl-3-methoxy-17α-methyl-gona-2,5(10)-dien-17β-ol treat 13β-isobutyl-3-methoxy-gona-2,5(10)-dien-17-one with methyl magnesium bromide according to the manipulative procedure described above.

To prepare 13β,17α - diethyl - 3-ethoxy-gona-2,5(10)-dien-17β-ol treat 13β-ethyl-3-ethoxy-gona-2,5(10) - dien-17-one with ethyl magnesium bromide according to the manipulative procedure described above.

To prepare 13β-ethyl-3-n-propoxy-17α-methyl-gona-2,5(10)-dien-17β-ol treat 13β - ethyl-3-n-propoxy-gona-2,5(10)-dien-17-one with methyl magnesium bromide according to the manipulative procedure described above.

To prepare 13β,17α - diethyl - 2,3-dimethoxy-gona-2,5(10)-dien-17β-ol treat 13β-ethyl-2,3-dimethoxy-gona-2,5(10)-dien-17-one with ethyl magnesium bromide according to the manipulative procedure described above.

To prepare 13β-ethyl-1,3-dimethoxy-17α-methyl-gona-1(10),3-dien-17β-ol treat 13β-ethyl-1,3-dimethoxy-gona-1(10),3-dien-17-one with methyl magnesium bromide according to the manipulative procedure described above.

To prepare 13β-phenethyl-3-n-propoxy-17α-ethyl-gona-2,5(10)-dien-17β-ol treat 13β - phenethyl-3-n-propoxy-gona-2,5(10)-dien-17-one with ethyl magnesium bromide according to the manipulative procedure described above.

To prepare 13β-isobutyl-3-n-pentoxy-17α-methyl-gona-2,5(10)-dien-17β-ol treat 13β-isobutyl-3-n-pentoxy-gona-2,5(10)-dien-17-one with methyl magnesium bromide according to the manipulative procedure described above.

To prepare 13β - (3 - hydroxypropyl)-3-cyclopentoxy-17α-ethyl-gona-2,5(10)-dien-17β-ol treat 13β-(3-hydroxypropyl) - 3 - cyclopentoxy-gona-2,5(10)-dien-17-one with ethyl magnesium bromide according to the manipulative procedure described above.

To prepare 13β - (3 - dimethylaminopropyl) - 1,3 - dimethoxy-17α-methyl-gona-1(10),3-dien-17β-ol treat 13β-

(3 - dimethylaminopropyl)-1,3-dimethoxy-gona-1(10),3-dien-17-one with methyl magnesium bromide according to the manipulative procedure described above.

EXAMPLE 38

13β,17α - di-n-propyl-3-methoxy-gona-2,5(10)-dien-17β-ol

Add a solution of 13β,17α-di-n-propyl-3-methoxy-gona-1,3,5(10)-trien-17β-ol in ether (100 cc.) to liquid ammonia (200 cc.) followed, portionwise, by lithium (1.5 g.). Stir the mixture for 1.5 hours and then add ethanol (35 cc.) ether (35 cc.) dropwise to discharge the blue color. Allow the ammonia to evaporate under nitrogen and then add water and extract the product with ether. Evaporate the washed, dried extracts and recrystallize the residue from ethanol to give 13β,17α-di-n-propyl-3-methoxy-gona-2,5(10)-dien-17β-ol (1.09 g.), M.P. 150–157°; infrared absorption peaks at 2.85, 5.90, 6.00μ.

EXAMPLE 39

13β - n - propyl - 3 - methoxy-17α-(1-methallyl)-gona-2,5(10)-dien-17β-ol

Add a solution of 13β - n - propyl-3-methoxy-gona-2,5(10)-dien-17-one (3.1 g.) in ether (130 cc.) with stirring under nitrogen to crotyl magnesium bromide (from crotyl bromide, 13.5 g., and magnesium, 9.7 g.) in ether. Reflux the mixture for 4 hours, and leave at room temperature overnight. Add saturated aqueous ammonium chloride (70 cc.) and extract the product with ether. Wash, dry and evaporate the extracts to yield 13β-n-propyl-3-methoxy-17α-(1-methallyl)-gona-2,5(10)-dien-17β-ol; infrared absorption peak at 11.0μ.

EXAMPLE 40

13β - n - propyl - 3 - methoxy - 17α - (2-methallyl)-gona-2,5(10)-dien-17β-ol

Employ the method of the previous example but react 13β - n-propyl-3-methoxy-gona-2,5(10)-dien-17-one (3.66 g. with 2-methallyl magnesium chloride) from the metal, (8.76 g. and 2-methallyl chloride, 10.9). Purify the crude product by extraction with boiling methanol to afford a residue of 13β - n - propyl-3-methoxy-17α-(2-methallyl)-gona-2,5(10)-dien-17β-ol (3.87 g.), M.P. 135–140°; infrared absorption peaks at 2.87, 5.90, 6.00, 6.09μ.

EXAMPLE 41

13β - n - butyl - 3 - methoxy-17α-ethynyl-gona-2,5(10)-dien-17β-ol

Add a solution of 13β-n-butyl-3-methoxy-gona-2,5(10)-dien-17-one (2 g.) in dimethylacetamide (200 cc.) slowly to a suspension of lithium carbide (2.5 g.) in dimethylacetamide (50 cc.) at 0° in an atmosphere of nitrogen. Stir the mixture at room temperature for 48 hours, cool to 0° and decompose by the dropwise addition of water (100 cc.). Add water and extract with ether to give after removal of the solvent, 13β-n-butyl-3-methoxy - 17α-ethynyl-gona-2,5(10)-dien-17β-ol (1.8 g.) as a gum; infrared absorption peaks at 2.95, 3.05, 5.90, 5.99μ.

EXAMPLE 42

13β - n - butyl - 3 - methoxy - 17α - ethyl-gona-2,5(10)-dien-17β-ol

Add lithium (1.5 g.) in small pieces, with stirring to 13β - n - butyl - 3-methoxy-17α-ethyl-gona-1,3,5(10-trien-17β-ol (1.57 g.) in a mixture of liquid ammonia (250 cc.) and pyrrole (100 cc.). After 2 hours add an excess of ammonium chloride, followed by water, and work up the product by means of ether. Dissolve the crystalline residue so obtained in a boiling mixture of ethanol and ether, charcoal, concentrate the filtrate and cool to give 13β-n-butyl - 3 - methoxy - 17α-ethyl-gona-2,5(10)-dien-17β-ol (1.05 g.), M.P. 121–124° C.; no selective ultraviolet absorption beyond 220 mμ; infrared absorption peaks at 3.08, 5.88, 5.99μ.

EXAMPLE 43

13β - ethyl - 17β - acetoxy-3-methoxygona-2,5(10)-diene

Dissolve 13β-ethyl-3-methoxygona-2,5(10)-dien-17β-ol (1.0 g.) in pyridine (6.0 cc.) and acetic anhydride (2.0 cc.) and stir the mixture for 24 hours. Add ether and wash the solution thoroughly with 5% aqueous sodium carbonate, and then with water until the washings are neutral. Dry and evaporate the solvent and recrystallize the residue from ether to obtain the title compound (0.65 g.), M.P. 143–146°; infrared absorption peaks at 5.77, 5.90, 6.0μ.

EXAMPLE 44

13β - ethyl - 17,17 - ethylenedioxy - 3 - methoxygona-2,5(10)-diene

Add 13β - ethyl - 17,17-ethylenedioxy-3-methoxygona-1,3,5(10)-triene (15.4 g.) in tetrahydrofuran (510 ml.) to a stirred solution of lithium (12.9 g.) in liquid ammonia (3200 ml.) and tetrahydrofuran (1400 ml.). Stir the mixture for 4½ hours and then add ethanol (370 ml.) dropwise. When the blue color is discharged, add saturated aqueous ammonium chloride and collect the product in ether. Evaporate the solvent and crystallize the residue from ethanol to obtain the title compound (12.0 g.), M.P. 130–134°.

EXAMPLE 45

13β - ethyl - 17β - (2-hydroxyethoxy) - 3 - methoxygona-2,5(10)-diene

Dissolve 13β-ethyl-17β-(2-hydroxyethoxy)-3-methoxygona-1,3,5(10)-triene (4.0 g.) in 1-methoxy-2-propanol (60 ml.), tetrahydrofuran (120 ml.) and liquid ammonia (300 ml.). Gradually add lithium (4.0 g.) with stirring over a period of one hour. Add ammonium chloride (8.0 g.) and water. Filter, wash and dry the resulting precipitate. Dissolve the product in tetrahydrofuran (300 ml.) and liquid ammonia (300 ml.) and treat with lithium (4.0 g.). Stir for one hour. Add absolute ethanol, then water. Filter the resulting precipitate and wash it with water to obtain the title compound (3.4 g.); essentially no ultraviolet absorption at the 280 mμ region, infrared absorption maxima at 2.91μ, 5.89μ, 6.0μ.

EXAMPLE 46

13β - ethyl - 17β - (1-hydroxyethyl)-3-methoxygona-2,5(10)-diene

Add a solution of 13β-ethyl-17β-(1-hydroxyethyl)-3-methoxygona-1,3,5(10)-triene (3.0 g.) in tetrahydrofuran (100 cc.) to distilled liquid ammonia (500 cc.) and then add lithium (3.0 g.) in small pieces. Stir the mixture for 1 hour and then add ethanol (110 cc.) over a period of 15 minutes. When the blue color is discharged, evaporate most of the ammonia, and acidify to pH 6 with acetic acid and extract with ether. Wash the ethereal solution with aqueous sodium carbonate, water and dry. Evaporate the solvent and recrystallize the residue from ethanol to obtain the title compound (1.84 g.); M.P. 153–159°; infrared absorption peaks at 2.85, 5.9, 6.0μ.

EXAMPLE 47

13β-ethyl-17β-ethoxy-3-methoxygona-2,5(10)-diene

Add lithium (2.0 g.) to a stirred suspension of 17β-ethoxy - 13β-ethyl-3-methoxygona-1,3,5(10)-triene (2.0 g.) in 1,2-dimethoxyethane (90 cc.), 1-methoxy-2-propanol (100 cc.) and liquid ammonia (300 cc.). When the lithium has dissolved, treat with ammonium chloride (2.0 g.), add water and filter the precipitate to obtain the crude title compound (2.0 g.).

EXAMPLE 48

13β-ethyl-3-methoxy-17β-propoxygona-2,5(10)-diene

Treat a suspension of 13β-ethyl-3-methoxy-17β-propoxygona-1,3,5(10)-triene (1.5 g.) in 1,2-dimethoxyethane (75 cc.), 1-methoxy-2-propanol (75 cc.) and liquid ammonia (300 cc.) with lithium (5.0 g.) in portions. When the lithium has dissolved add ammonium chloride (1.5 g.) followed by water, and collect the precipitate and dry to obtain the crude title compound (1.4 g.).

EXAMPLE 49

13β-ethyl-17β-(2-diethylaminoethoxy)-3-methoxygona-2,5(10)-diene

Add lithium (3.0 g.) to a stirred solution of 17β-(2-diethylaminoethoxy) - 13β - ethyl - 3-methoxygona-1,3,5 (10)-triene (4.0 g.) in morpholine (200 cc.), tetrahydrofuran (200 cc.), 1-methoxy-2-propanol (100 cc.) and liquid ammonia (500 cc.). When the lithium has dissolved, treat with ammonium chloride (25 g.) and water and extract with ether. Wash, dry and evaporate the ethereal solution to obtain the crude title compound (3.0 g.) as a gum.

EXAMPLE 50

13β-ethyl-17β-(2-dimethylaminoethoxy)-3-methoxygona-2,5(10)-diene

To a stirred solution of 13β-ethyl-17β-(2-dimethylaminoethoxy)-3-methoxygona-1,3,5(10)-triene (0.4 g.) in tetrahydrofuran (75 cc.) and liquid ammonia (120 cc.) add lithium (0.5 g.) and stir for 3 hours. Add absolute alcohol dropwise until the solution turns colorless and then ammonium chloride (6.0 g.) and water. Filter the precipitate to obtain the crude title compound (0.2 g.).

EXAMPLE 51

13β-ethyl-17α-(1-hydroxyethyl)-3-methoxygona-2,5(10)-dien-17β-ol

Reduce 13β - ethyl-17α-acetyl-17-hydroxy-3-methoxygona-1,3,5(10)-triene, acetate, (1.0 g.) in lithium aluminum hydride and ether to produce a gum, 13β-ethyl-17β - hydroxy - 17-(1-hydroxyethyl)-3-methoxy-gona-1,3, 5(10)-triene (0.9 g.); infrared absorption peak very strong at 2.9μ (OH band). Reduce 13β-ethyl-17β-hydroxy - 17 - (1-hydroxyethyl)-3-methoxygona-1,3,5(10)-triene (0.9 g.) with tetrahydrofuran (60 ml.), liquid ammonia (150 ml.), lithium (700 mg.) and absolute ethanol, add water and filter the precipitate to obtain the title compound (0.70 g.), M.P. 152–161°; ultraviolet analysis indicating no remaining aromatic system, infrared maxima at 3.0μ, 5.9μ, 6.0μ.

EXAMPLE 52

13β-ethyl-17aα-chloroethynyl-3-methoxy-D-homogona-2,5(10)-dien-17aβ-ol

Dilute methyl lithium (94.6 g., .218 M) in ether with ether (200 cc.) and cool to 0°. Add cis-dichloroethylene (11.0 g., .109 M) over one hour. Add dl-13-ethyl-3-methoxy - D-homogona-2,5(10)-dien-17a-one (12.0 g.) suspended in ether (250 cc.). Stir at room temperature for one hour, cool in an ice bath and add saturated aqueous ammonium chloride (250 cc.) dropwise. Separate, wash, dry and evaporate the ether layer and triturate the crystalline residue with boiling methanol (100 cc.) to obtain the title compound (13.0 g.), M.P. 120–126° C., $\lambda_{max.}$ KBr 3.0μ, 4.54μ, 5.90μ, 5.99μ.

EXAMPLE 53

3-methoxy-13β-n-propyl-D-homogona-2,5(10)-dien-17aβ-ol

Treat 3 - methoxy-13-propyl-D-homogona-1,3,5(10)-trien-17aβ-ol (13.0 g.) dissolved in tetrahydrofuran (240 cc.) and liquid ammonia (500 cc.) with lithium metal (3.5 g.). Stir 1.5 hours, discharge the blue color by dropwise addition of absolute ethanol, add water and filter the crude product. Triturate with methanol (110 cc.) to obtain the title product (11.4 g.), M.P. 150–157°, $\lambda_{max.}$ KBr 3.09μ, 5.90μ, 6.0μ.

EXAMPLE 54

3-methoxy-13β-n-propyl-D-homogona-2,5(10)-dien-17a-one

Reflux 3 - methoxy-13β-n-propyl-D-homogona-2,5(10)-dien-17aβ-ol (10 g.) with aluminum isopropoxide (8.0 g.) in toluene (400 cc.) and cyclohexanone (100 cc.) for 2 hours in an atmosphere of nitrogen. Shake the cooled reaction mixture with water (5 cc.) and then dry by adding anhydrous sodium sulfate (10 g.). Filter and evaporate the solvents and recrystallise the residue from methanol at −10° to obtain the title compound (8.0 g.), M.P. 121–130°.

EXAMPLE 55

17a-ethynyl-3-methoxy-13β-n-propyl-D-homogona-2,5 (10)-dien-17aβ-ol

Stir 3 - methoxy-13β-n-propyl-D-homogona-2,5(10)-dien-17a-one (8.0 g.) in dimethylacetamide (200 cc.) with lithium acetylide-ethylenediamine complex (7.5 g.) in dioxan (45 cc.) in an atmosphere of acetylene for 24 hours. Pour into ice and water, extract with ether and wash, dry and evaporate the ethereal solution. Crystallize the residue from methanol to obtain the title compound (4.0 g.), M.P. 65–75°.

EXAMPLE 56

13β-ethyl-3-methoxy-17aα-methyl-D-homogona-2,5(10)-dien-17aβ-ol

To a stirred solution of 3-methoxy-17aα-methyl-13β-ethyl-D-homogona-1,3,5(10)-trien-17aβ-ol (8.0 g.) in tetrahydrofuran (240 cc.) and liquid ammonia (500 cc.) add lithium (3.0 g.) and stir for 1 hour. Add ethanol dropwise over 20 minutes to discharge the blue color, and then add water and filter and dry the precipitate to obtain the title compound (7.2 g.), M.P. 175–180°.

EXAMPLE 57

13β-ethyl-3-methoxy-17α-tetrahydropyranyloxypropargylgona-2,5(10)-dien-17-ol

Reflux a mixture of 3 molar ethereal methyl magnesium bromide (20 cc.) and tetrahydropyranyloxypropargyl (10 g.) in tetrahydrofuran (8 cc.) for 3 hours with stirring. Add 13β-ethyl-3-methoxygona-2,5(10)-dien-17-one (5 g.) in tetrahydrofuran (20 cc.) and reflux for a further 3.5 hours and then allow to stand at 25° for 16 hours. Decompose the reaction mixture by adding water, filter, and separate the organic layer. Wash with water, dry and evaporate and crystallize the residue from ethanol-hexane (1:1) to obtain the title compound (3.75 g.), M.P. 120–126°; infrared absorption peaks at 2.95, 3.45, 5.90, 6.00μ.

EXAMPLE 58

17α-chloroethynyl-13β-ethyl-3-methoxygona-2,5(10)-dien-17β-ol

Add trans-dichloroethylene (60 g.) dropwise to a solution of methyl lithium (23.6 g.) in ether (406 g.) at 0° with stirring under nitrogen. Allow the temperature to rise to 20° and then add a slurry of 13β-ethyl-3-methoxy-gona-2,5(10)-dien-17-one (63.5 g.) in tetrahydrofuran (500 cc.) and stir for 2 hours. Carefully add ice-water (500 cc.), extract with ether and wash, dry and evaporate the ethereal solution. Triturate the residue with hot methanol to obtain the title compound (73 g.).

EXAMPLE 59

17α-chloroethynyl-3-methoxy-13β-n-propylgona-2,5(10)-dien-17β-ol

Add 3-methoxy - 13β-n-propylgona-2,5(10)-dien-17-one (8 g.) in ether (250 cc.) with stirring under nitrogen to lithium chloroacetylide (from lithium methyl, 5.35 g., and cis-dichloroethylene (16.9 g.) in ether (300 cc.) and stir the mixture for 20 hours at 25° and then cool in an acetone-dry ice bath. Add saturated ammonium chloride (50 cc.) dropwise followed by water (200 cc.) and allow the mixture to warm to 25°. Separate the ether layer, wash with water, dry and evaporate and recrystallize the residue from methanol to obtain the title compound (2.5 g.), M.P. 110–116°.

EXAMPLE 60

13β-methyl-3-methoxygona-2,5(10)-dien-17β-ol

Add 3-methoxyestra - 1,3,5(10)-trien-17β-ol (1.3 g.) in tetrahydrofuran (40 ml.) to a stirred solution of lithium (1.3 g.) in liquid ammonia (100 ml.). After 15 minutes add ethanol (20 ml.) dropwise and when the blue color is discharged add ammonium chloride and water and extract the mixture with ether. Wash, dry and evaporate the ethereal solution and recrystallize the residue from ethanol-hexane to obtain the title compound (0.84 g.), M.P. 120–123°; infrared absorption maxima at 3.25μ, 5.8μ, 6μ.

EXAMPLE 61

13β-methyl-3-methoxygona-2,5(10)-dien-17-one

Add aluminum isopropoxide (4.0 g.) in toluene (56 cc.) to a solution of 13β-methyl - 3-methoxygona-2,5(10)-dien-17β-ol (4.0 g.) in cyclohexanone (40 cc.) and toluene (140 cc.) and reflux the mixture in an atmosphere of nitrogen for 2 hours. Add water (7.5 cc.) to the cooled solution and then anhydrous sodium sulphate (10 g.). Filter and evaporate the filtrate, finally at 60°/0.2 mm. and recrystallize the residue from methanol to obtain the title compoupnd (3.5 g.), M.P. 116–118°; infrared absorption peaks at 5.76, 5.90, 6.01μ.

EXAMPLE 62

17α-ethynyl-13β-methyl-3-methoxygona-2,5(10)-dien-17β-ol

Dissolve 13β-methyl - 3-methoxygona-2,5(10)-dien-17-one (3.5 g.) in dimethylacetamide (100 cc.) and add the solution to a suspension of lithium acetylide-ethylenediamine complex (3.7 g.) in dioxane (25 cc.) and dimethylacetamide (20 cc.). Stir for 3 hours in an atmosphere of acetylene, then pour into water and extract with ether. Wash, dry and evaporate the ethereal solution and recrystallize the residue methanol to obtain the title compound (2.0 g.), M.P. 160–164°.

EXAMPLE 63

17α-chloroethynyl-13β-methyl-3-methoxygona-2,5(10)-dien-17β-ol

Add dichloroethylene (5.4 g.) dropwise to a solution of lithium methyl (2.1 g.) in ether (40 cc.) at 0° in an atmosphere of nitrogen and then add 13β-methyl-3-methoxygona-2,5(10)-dien-17-one (5.2 g.) and stir for 2 hours. Cool in an acetone-dry ice bath, add water, allow to warm to room temperature and extract with ether. Wash, dry and evaporate the ethereal solution and recrystallize the residue from methanol to obtain the title compound (5.5 g.) M.P. 113–118°.

EXAMPLE 64

17α-ethyl-13β-methyl-3-methoxygona-2,5(10)-dien-17β-ol

Add a solution of 17α-ethyl-13β-methyl - 3-methoxygona-1,3,5(10)-trien-17β-ol (3.3 g.) in ether (70 cc.) to distilled ammonia (200 cc.) and then add lithium (2.8 g.) portionwise to the stirred solution. After 1 hour add ethanol (22 cc.) dropwise over a period of 1 hour and when the blue color is discharged add water, extract with ether and wash, dry and evaporate the ethereal solution. Recrystallize the residue from ether-methanol to obtain the title compound (2.6 g.), M.P. 130–134°.

EXAMPLE 65

13β-ethyl-3-methoxy-6-methylgona-2,5(10)-dien-17β-ol

Add 13β-ethyl-3-methoxy - 6-methylgona - 1,3,5(10)-trien-17β-ol (6.80 g.) in tetrahydrofuran (200 ml.) to ammonia (800 ml.) containing tetrahydrofuran (250 ml.). Add lithium (3.5 g.) and stir the solution for 1.75 hours. Discharge the blue color by dropwise addition of ethanol over a period of 0.25 hour. Add water. Filter and dry to obtain the title product (6.5 g.), M.P. 176–182°; infrared absorption peaks (potassium bromide) at 3.05μ, 5.90μ, 6.0μ, no selective ultraviolet absorption above 220 mμ.

EXAMPLE 66

13β-ethyl-6-methyl-3-methoxygona-2,5(10)-dien-17-one

Dissolve 13β-ethyl - 3-methoxy - 6-methylgona-2,5(10)-dien-17β-ol (5.5 g.) in toluene (200 ml.) containing cyclohexanone (70 ml.) and treat with aluminum isopropoxide (4.0 g.) in toluene (50 ml.). Reflux under nitrogen for 2.5 hours, then add water (10 ml.) followed by anhydrous sodium sulfate (5 g.). Stir the suspension for 0.5 hour, filter, and wash the filter cake with benzene. Remove the solvents and concentrate the residue at 100° under vacuum (.02 mm.). Triturate the crystalline residue with ice-cold methanol to obtain the title compound (3.6 g.), M.P. 118–125°; infrared absorption peaks (potassium bromide) at 5.78μ, 5.90μ, 6.00μ, no selective ultraviolet absorption above 220 mμ.

EXAMPLE 67

13β-ethyl-3-methoxy-6-methyl-17α-ethynylgona-2,5(10)-dien-17β-ol

Dissolve 13β-ethyl-6-methyl - 3 - methoxygona-2,5(10)-dien-17-one (3.6 g.) in dimethylacetamide (35 ml.) and stir in a stream of acetylene for 0.5 hour. Add solid lithium acetylide-ethylenediamine (2.7 g.) and stir the solution for 4 hours. Pour the reaction mixture onto ice, extract with ether, wash the ether layer with water, dry, and evaporate to obtain the title compound (3.5 g.) as a gum; infrared absorption peaks (sodium chloride) at 2.90μ, 3.05μ, 5.90μ, 6.03μ.

EXAMPLE 68

13β'-ethyl-3,5-dihydro-3'-methoxyspiro-[furan-2-(3H), 17'-gona-2',5'(10')-diene]

Dissolve 13β'-ethyl-4,5-dihydro-3'-methoxyspiro-[furan-2-(3H),17'-gona-1',3',5'(10')-triene] (2.5 g.) in tetrahydrofuran (200 cc.) and liquid ammonia (360 cc.) and add lithium (2 g.) in portions to the stirred solution. After 4½ hours add ethanol (10 cc.) dropwise over 30 minutes and when the blue color is discharged evaporate most of the ammonia and add water. Filter the precipitate and recrystallize from methanol to give the title compound (2.05 g.) M.P. 142–146°.

EXAMPLE 69

3-(13-ethyl-17β-hydroxy-3-methoxygona-2,5(10)-dien-17α-yl) propionic acid, γ-lactone Reflux 3-(13-ethyl-17β-hydroxy-3-methoxygona - 1,3,5 (10)-trien-17α-yl) propionic acid, γ-lactone (3.0 g.) with triethylamine (180 cc.) and sodium hydroxide (1.0 g.) in water (33 cc.) for 16 hours. Evaporate the mixture to dryness and treat the residue with a solution of tert-butyl alcohol (100 cc.) 1-methoxy-2-propanol (200 cc.) and liquid ammonia (600 cc.). Add lithium (5.0 g.) to the stirred solution and after 40 minutes add ammonium chloride (40 g.) followed by water. Acidify with cold 6N hydrochloric acid in the presence of ice and filter off the precipitate, wash with water and dry to obtain the title compound (2.4 g.); no selective ultraviolet absorption beyond 220 mμ.

EXAMPLE 70

3-(13-n-propyl-17β-hydroxy-3-methoxygona-2,5(10)-dien-17α-yl) propionic acid, γ-lactone Add 3-(13-n-propyl-17β-hydroxy-3-methoxygona-1,3,5(10)-trien-17α-yl) propionic acid, γ-lactone (3.05 g.) to sodium hydroxide (0.32 g.) in methanol and evaporate the resulting solution to dryness. Dissolve the residue in tetrahydrofuran (50 cc.) and tert-butyl alcohol (50 cc.) and add the solution to liquid ammonia (300 cc.). Add lithium (5.0 g.) to the stirred solution and after 2 hours add ethanol (85 cc.) dropwise. Evaporate the ammonia and add water (300 cc.) followed by 50% aqueous acetic acid (200 cc.). Extract the mixture with chloroform and wash, dry and evaporate the organic solution to obtain the title compound, in admixture with the corresponding hydroxy-acid (1.66 g.), M.P. 170–200°.

The subject matter which the applicants regard as their invention is particularly pointed out and distinctly claimed as follows:

1. A chemical compound of the structure

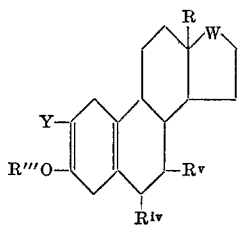

wherein W is selected from the group consisting of keto,

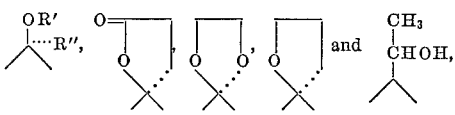

wherein R is lower alkyl containing at least two carbon atoms, R' is a member of the group consisting of hydrogen, lower alkanoyl, lower alkyl, di-lower alkyl amino lower alkyl, and hydroxy lower alkyl, R'' is a member of the group consisting of hydrogen, lower alkyl, lower alkenyl, lower alkynyl, halo lower alkynyl and 1-hydroxyalkyl, R''' is a member of the group consisting of cycloalkyl and lower alkyl, and $R^{iv}$ and $R^v$ are members of the group consisting of hydrogen and lower alkyl, and wherein Y is selected from the group consisting of hydrogen and lower alkoxy.

2. The compound according to claim 1, 13β-ethyl-3-methoxygona-2,5(10)-dien-17β-ol.

3. The compound according to claim 1, 13β-ethyl-3-methoxygona-2,5(10)-dien-17-one.

4. The compound according to claim 1, 13β-ethyl-3-methovy-17α-ethynylgona-2,5(10)-dien-17β-ol.

5. The compound according to claim 1, 13β,17α-diethyl-3-methoxygona-2,5(10)-dien-17β-ol.

6. The compound according to claim 1, 17α-chloroethynyl-13β-ethyl-3-methoxygona-2,5(10)-dien-17β-ol.

7. The compound according to claim 1, 13β-ethyl-17,17-ethylenedioxy-3-methoxygona-2,5(10)-diene.

8. The compound according to claim 1, 13β-ethyl-3-methoxy-6-methylgona-2,5(10)-dien-17β-ol.

9. The compound according to claim 1, 13β-ethyl-17α-ethynyl-6-methyl-3-methoxygona-2,5(10)-dien-17β-ol.

10. The compound according to claim 1, 13β-n-propyl-3-methoxygona-2,5(10)-dien-17β-ol.

11. The compound according to claim 1, 17α-ethynyl-13β-n-propyl-3-methoxygona-2,5(10)-dien-17β-ol.

12. A process for preparing a compound having a gonane nucleus unsaturated at the 2- and 5(10)-positions and substituted in the 13-position by a monovalent polycarbon-alkyl radical, comprising: reducing a compound having a gonane nucleus wherein the A-ring is aromatic and which is unsaturated in the 8-position and substituted at the 13-position by a monovalent polycarbon-alkyl radical, with an alkali metal in liquid ammonia in the presence of a proton donor.

13. A process for preparing a compound having a gonane nucleus unsaturated at the 2- and 5(10)-positions, substituted at the 17-position with hydroxy, and substituted at the 13-position by a monovalent polycarbonalkyl radical, comprising: (a) reducing a compound having a gonane nucleus wherein the A-ring is aromatic and which is unsaturated at the 8-position, substituted at the 17-position by divalent oxygen, and substituted at the 13-position by a monovalent polycarbon-alkyl radical, with a complex metal hydride to form the corresponding 17-ol compound; (b) reducing the 8-unsaturation of said 17-ol compound with nascent hydrogen to form a compound having a gonane nucleus wherein the A-ring is aromatic, and which is substituted at the 17-position with hydroxy, and substituted at the 13-position by a monovalent polycarbon-alkyl radical; and, (c) partially reducing the A-ring of said gonane by treatment with an alkali metal in liquid ammonia in the presence of a proton donor.

14. A process for preparing a compound having a gonane nucleus unsaturated at 2- and 5(10)-positions and substituted in the 13-position by a methyl radical, comprising: reducing a compound having a gonane nucleus wherein the A-ring is aromatic and which is unsaturated in the 8-position, and substituted at the 13-position by a methyl radical, with an alkali metal in liquid ammonia in the presence of a proton donor.

15. The compound of the formula

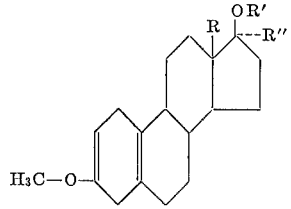

wherein R is lower alkyl containing at least two carbon atoms, R' is a member of the group consisting of hydrogen and lower alkanoyl and R'' is a member of the group consisting of hydrogen, lower alkyl, lower alkenyl, lower alkynyl and halo lower alkynyl.

References Cited

UNITED STATES PATENTS

| | | | |
|---|---|---|---|
| 2,655,518 | 10/1953 | Colton | 260—397.4 |
| 2,691,028 | 10/1954 | Colton | 260—397.5 |
| 2,806,030 | 9/1957 | Ringold et al. | 260—239.55 |
| 3,096,353 | 7/1963 | Fried et al. | 260—397.4 |

OTHER REFERENCES

Fieser et al.: Steriods, page 51 (1959), Reinhold Pub. Co., New York.

HENRY A. FRENCH, Primary Examiner

U.S. Cl. X.R.

260—239.57, 397.4, 397.5, 570.5, 570.8, 590, 618, 650, 668, 999